US010296611B2

(12) United States Patent
Wein et al.

(10) Patent No.: US 10,296,611 B2
(45) Date of Patent: May 21, 2019

(54) OPTIMIZED ROLLOVER PROCESSES TO ACCOMMODATE A CHANGE IN VALUE IDENTIFIER BIT SIZE AND RELATED SYSTEM RELOAD PROCESSES

(71) Applicants: David Wein, St. Paul, MN (US); Mihnea Andrei, Issy les Moulineaux (FR); Ivan Schreter, Malsch (DE); Rolando Blanco, Ontario (CA); Thomas Legler, Walldorf (DE)

(72) Inventors: David Wein, St. Paul, MN (US); Mihnea Andrei, Issy les Moulineaux (FR); Ivan Schreter, Malsch (DE); Rolando Blanco, Ontario (CA); Thomas Legler, Walldorf (DE)

( * ) Notice: Subject to any disclaimer, the term of this patent is extended or adjusted under 35 U.S.C. 154(b) by 1034 days.

(21) Appl. No.: 14/553,844

(22) Filed: Nov. 25, 2014

(65) Prior Publication Data
US 2016/0147801 A1 May 26, 2016

(51) Int. Cl.
G06F 17/30 (2006.01)
G06F 3/06 (2006.01)
G06F 13/14 (2006.01)

(52) U.S. Cl.
CPC ...... G06F 17/30315 (2013.01); G06F 3/0604 (2013.01); G06F 3/064 (2013.01); G06F 3/0673 (2013.01)

(58) Field of Classification Search
CPC ......... G06F 17/30312; G06F 17/30315; G06F 17/30595; G06F 17/30864; G06F 17/30117; G06F 17/30321; G06F 17/30339; G06F 17/30604; G06F 17/30286; G06F 17/30466; G06F 17/30; G06F 17/3028; G06F 17/30371; G06F 17/30501;
(Continued)

(56) References Cited

U.S. PATENT DOCUMENTS 5,222,235 A 6/1993 Hintz et al.
5,280,612 A 1/1994 Lorie et al.
(Continued)

FOREIGN PATENT DOCUMENTS

EP 2778961 A1 9/2014
WO WO-01/29690 A2 4/2001

OTHER PUBLICATIONS

"NBit Dictionary Compression," Sybase, May 23, 2013. Web. Mar. 15, 2017 <http://infocenter.sybase.com/help/index.jsp?topic=/com.sybase.infocenter.dc1777.1600/doc/html/wil1345808527844.html>.
(Continued)

Primary Examiner — Arpan P. Savla
Assistant Examiner — Cecile H Vo
(74) Attorney, Agent, or Firm — Mintz Levin Cohn Ferris Glovsky and Popeo, P.C.

(57) ABSTRACT

The subject matter disclosed herein provides methods for reformatting a page due to a rollover. An in-memory array holding a column of data can be maintained. One or more pages can be maintained. Each page can have one or more rows for storing the column of data. The column of data in the in-memory array can be monitored for a change. A rollover can be performed on at least one of the pages based on the change. The rollover can reformat the at least one page by rewriting metadata associated with the at least one page. Related apparatus, systems, techniques, and articles are also described.

17 Claims, 16 Drawing Sheets

(58) Field of Classification Search
CPC ......... G06F 17/30082; G06F 17/30221; G06F 17/30368; G06F 17/30607; G06F 17/3089; G06F 17/30899; G06F 17/30115; G06F 17/3023
USPC .............. 707/E17.014, 693, 812, E17.044, 707/E17.002, 736, 999.101, E17.045, 707/E17.055, E17.089, E17.117, E17.125, 707/E17.141, 600, 741, E17.005, 999.2, 707/E17.01, E17.116, 639, 705, 825, 707/E17.001, E17.009, 999.201
See application file for complete search history.

(56) References Cited

U.S. PATENT DOCUMENTS

| | | | |
|---|---|---|---|
| 5,594,898 | A | 1/1997 | Dalal et al. |
| 5,701,480 | A | 12/1997 | Raz |
| 5,717,919 | A | 2/1998 | Kodavalla et al. |
| 5,758,145 | A | 5/1998 | Bhargava et al. |
| 5,794,229 | A | 8/1998 | French et al. |
| 5,870,758 | A | 2/1999 | Bamford et al. |
| 5,933,833 | A | 8/1999 | Musashi |
| 6,070,165 | A | 5/2000 | Whitmore |
| 6,275,830 | B1 | 8/2001 | Muthukkaruppan et al. |
| 6,282,605 | B1 | 8/2001 | Moore |
| 6,397,227 | B1 | 5/2002 | Klein et al. |
| 6,453,313 | B1 | 9/2002 | Klein et al. |
| 6,490,670 | B1 | 12/2002 | Collins et al. |
| 6,567,407 | B1 | 5/2003 | Mizukoshi |
| 6,606,617 | B1 | 8/2003 | Bonner et al. |
| 6,668,263 | B1 | 12/2003 | Cranston et al. |
| 6,754,653 | B2 | 6/2004 | Bonner et al. |
| 6,865,577 | B1 | 3/2005 | Sereda |
| 7,698,712 | B2 | 4/2010 | Schreter |
| 7,761,434 | B2 | 7/2010 | Surtani et al. |
| 8,024,296 | B1 | 9/2011 | Gopinathan et al. |
| 8,161,024 | B2 | 4/2012 | Renkes et al. |
| 8,170,981 | B1 | 5/2012 | Tewksbary |
| 8,224,860 | B2 | 7/2012 | Starkey |
| 8,364,648 | B1 | 1/2013 | Sim-Tang |
| 8,510,344 | B1 | 8/2013 | Briggs et al. |
| 8,650,583 | B2 | 2/2014 | Schreter |
| 8,732,139 | B2 | 5/2014 | Schreter |
| 8,768,891 | B2 | 7/2014 | Schreter |
| 8,868,506 | B1 | 10/2014 | Bhargava et al. |
| 9,058,268 | B1 | 6/2015 | Ostiguy et al. |
| 9,098,522 | B2 | 8/2015 | Lee et al. |
| 9,141,435 | B2 | 9/2015 | Wein |
| 9,262,330 | B2 * | 2/2016 | Muthukumarasamy ................. G06F 12/0207 |
| 9,268,810 | B2 | 2/2016 | Andrei et al. |
| 9,275,095 | B2 | 3/2016 | Bhattacharjee et al. |
| 9,275,097 | B2 | 3/2016 | DeLaFranier et al. |
| 9,305,046 | B2 | 4/2016 | Bhattacharjee et al. |
| 9,372,743 | B1 | 6/2016 | Sethi et al. |
| 9,430,274 | B2 | 8/2016 | Zhang |
| 9,489,409 | B2 * | 11/2016 | Sharique ........... G06F 17/30091 |
| 9,645,844 | B2 | 5/2017 | Zhang |
| 9,665,609 | B2 | 5/2017 | Andrei et al. |
| 9,811,577 | B2 | 11/2017 | Martin et al. |
| 2001/0051944 | A1 | 12/2001 | Lim et al. |
| 2002/0107837 | A1 | 8/2002 | Osborne et al. |
| 2002/0156798 | A1 | 10/2002 | Larue et al. |
| 2003/0028551 | A1 | 2/2003 | Sutherland |
| 2003/0065652 | A1 | 4/2003 | Spacey |
| 2003/0204534 | A1 | 10/2003 | Hopeman et al. |
| 2003/0217075 | A1 | 11/2003 | Nakano et al. |
| 2004/0034616 | A1 | 2/2004 | Witkowski et al. |
| 2004/0054644 | A1 | 3/2004 | Ganesh et al. |
| 2004/0064601 | A1 | 4/2004 | Swanberg |
| 2004/0249838 | A1 | 12/2004 | Hinshaw et al. |
| 2005/0027692 | A1 | 2/2005 | Shyam et al. |
| 2005/0097266 | A1 | 5/2005 | Factor et al. |
| 2005/0234868 | A1 * | 10/2005 | Terek ................... G06F 9/4493 |
| 2006/0004833 | A1 | 1/2006 | Trivedi et al. |
| 2006/0005191 | A1 | 1/2006 | Boehm |
| 2006/0036655 | A1 | 2/2006 | Lastovica |
| 2006/0206489 | A1 | 9/2006 | Finnie et al. |
| 2007/0192360 | A1 | 8/2007 | Prahlad et al. |
| 2008/0046444 | A1 | 2/2008 | Fachan et al. |
| 2008/0183958 | A1 | 7/2008 | Cheriton |
| 2008/0247729 | A1 | 10/2008 | Park |
| 2009/0064160 | A1 | 3/2009 | Larson et al. |
| 2009/0080523 | A1 | 3/2009 | McDowell |
| 2009/0094236 | A1 | 4/2009 | Renkes et al. |
| 2009/0254532 | A1 | 10/2009 | Yang et al. |
| 2009/0287703 | A1 | 11/2009 | Furuya |
| 2009/0287737 | A1 | 11/2009 | Hammerly |
| 2010/0082545 | A1 | 4/2010 | Bhattacharjee et al. |
| 2010/0088309 | A1 | 4/2010 | Petculescu et al. |
| 2010/0241812 | A1 | 9/2010 | Bekoou |
| 2010/0281005 | A1 | 11/2010 | Carlin et al. |
| 2010/0287143 | A1 | 11/2010 | Di Carlo et al. |
| 2011/0010330 | A1 | 1/2011 | McCline et al. |
| 2011/0060726 | A1 | 3/2011 | Idicula et al. |
| 2011/0087854 | A1 | 4/2011 | Rushworth et al. |
| 2011/0145835 | A1 | 6/2011 | Rodrigues et al. |
| 2011/0153566 | A1 | 6/2011 | Larson et al. |
| 2011/0252000 | A1 | 10/2011 | Diaconu et al. |
| 2011/0270809 | A1 | 11/2011 | Dinkar et al. |
| 2011/0276744 | A1 | 11/2011 | Sengupta et al. |
| 2011/0302143 | A1 | 12/2011 | Lomet |
| 2012/0011106 | A1 | 1/2012 | Reid et al. |
| 2012/0047126 | A1 | 2/2012 | Branscome et al. |
| 2012/0102006 | A1 | 4/2012 | Larson et al. |
| 2012/0137081 | A1 | 5/2012 | Shea |
| 2012/0179877 | A1 | 7/2012 | Shriraman et al. |
| 2012/0191696 | A1 | 7/2012 | Renkes et al. |
| 2012/0221528 | A1 | 8/2012 | Renkes et al. |
| 2012/0233438 | A1 * | 9/2012 | Bak ................... G06F 12/0223 711/206 |
| 2012/0265728 | A1 | 10/2012 | Plattner et al. |
| 2012/0284228 | A1 | 11/2012 | Ghosh et al. |
| 2013/0054936 | A1 | 2/2013 | Davis |
| 2013/0091162 | A1 | 4/2013 | Lewak |
| 2013/0097135 | A1 | 4/2013 | Goldberg |
| 2013/0103655 | A1 | 4/2013 | Fanghaenel et al. |
| 2013/0117247 | A1 * | 5/2013 | Schreter ............ G06F 17/30315 707/703 |
| 2013/0166566 | A1 | 6/2013 | Lemke et al. |
| 2013/0346378 | A1 | 12/2013 | Tsirogiannis et al. |
| 2014/0025651 | A1 | 1/2014 | Schreter |
| 2014/0101093 | A1 | 4/2014 | Lanphear et al. |
| 2014/0136571 | A1 | 5/2014 | Bonvin et al. |
| 2014/0214334 | A1 | 7/2014 | Plattner et al. |
| 2014/0222418 | A1 | 8/2014 | Richtarsky et al. |
| 2014/0279930 | A1 | 9/2014 | Gupta et al. |
| 2014/0279961 | A1 | 9/2014 | Schreter et al. |
| 2015/0039573 | A1 | 2/2015 | Bhattacharjee et al. |
| 2015/0089125 | A1 | 3/2015 | Mukherjee et al. |
| 2015/0113026 | A1 * | 4/2015 | Sharique ........... G06F 17/30091 707/812 |
| 2015/0142819 | A1 | 5/2015 | Florendo et al. |
| 2015/0193264 | A1 | 7/2015 | Hutton et al. |
| 2015/0261805 | A1 | 9/2015 | Lee et al. |
| 2015/0278281 | A1 | 10/2015 | Zhang |
| 2016/0103860 | A1 | 4/2016 | Bhattacharjee et al. |
| 2016/0125022 | A1 | 5/2016 | Rider et al. |
| 2016/0147445 | A1 | 5/2016 | Schreter et al. |
| 2016/0147447 | A1 | 5/2016 | Blanco et al. |
| 2016/0147448 | A1 | 5/2016 | Schreter et al. |
| 2016/0147449 | A1 | 5/2016 | Andrei et al. |
| 2016/0147457 | A1 | 5/2016 | Legler et al. |
| 2016/0147459 | A1 | 5/2016 | Wein et al. |
| 2016/0147617 | A1 | 5/2016 | Lee et al. |
| 2016/0147618 | A1 | 5/2016 | Lee et al. |
| 2016/0147750 | A1 | 5/2016 | Blanco et al. |
| 2016/0147776 | A1 | 5/2016 | Florendo et al. |
| 2016/0147778 | A1 | 5/2016 | Schreter et al. |
| 2016/0147786 | A1 | 5/2016 | Andrei et al. |
| 2016/0147801 | A1 | 5/2016 | Wein et al. |
| 2016/0147804 | A1 | 5/2016 | Wein et al. |
| 2016/0147806 | A1 | 5/2016 | Blanco et al. |

(56) References Cited

U.S. PATENT DOCUMENTS

| | | |
|---|---|---|
| 2016/0147808 A1 | 5/2016 | Schreter et al. |
| 2016/0147809 A1 | 5/2016 | Schreter et al. |
| 2016/0147811 A1 | 5/2016 | Eluri et al. |
| 2016/0147812 A1 | 5/2016 | Andrei et al. |
| 2016/0147813 A1 | 5/2016 | Lee |
| 2016/0147814 A1 | 5/2016 | Goel et al. |
| 2016/0147819 A1 | 5/2016 | Schreter et al. |
| 2016/0147820 A1 | 5/2016 | Schreter |
| 2016/0147821 A1 | 5/2016 | Schreter et al. |
| 2016/0147834 A1 | 5/2016 | Lee et al. |
| 2016/0147858 A1 | 5/2016 | Lee et al. |
| 2016/0147859 A1 | 5/2016 | Lee et al. |
| 2016/0147861 A1 | 5/2016 | Schreter et al. |
| 2016/0147862 A1 | 5/2016 | Schreter et al. |
| 2016/0147904 A1 | 5/2016 | Wein et al. |
| 2016/0147906 A1 | 5/2016 | Schreter et al. |

OTHER PUBLICATIONS

"HANA database lectures—Outline Part 1 Motivation—Why main memory processing." Mar. 2014 (Mar. 2014). XP055197666. Web. Jun. 23, 2015. 81 pages. URL: <http://cse.yeditepe.edu.tr/-odemir/spring2014/cse415/HanaDatabase.pdf>.

"HANA Persistence: Shadow Pages." Jun. 2013. *Yeditepe Üniversitesi Bilgisayar Mühendisliği Bölülmü.* Web. Apr. 21, 2016. 32 pages. <http://cse.yeditepe.edu.tr/~odemir/spring2014/cse415/Persistency.pptx>.

"Optimistic concurrency control." *Wikipedia: The Free Encyclopedia.* Wikimedia Foundation, Inc., Jul. 19, 2014. Web. Mar. 3, 2016. pp. 1-3.

Brown, E. et al. "Fast Incremental Indexing for Full-Text Information Retrieval." *VLDB '94 Proceedings of the 20th International Conference on Very Large Data Bases.* San Francisco: Morgan Kaufmann, 1994. pp. 1-11.

Jens Krueger et al. "Main Memory Databases for Enterprise Applications." Industrial Engineering and Engineering Management (IE &EM), 2011 IEEE 18th International Conference on, IEEE, Sep. 3, 2011 (Sep. 3, 2011), pp. 547-557, XP032056073.

Lemke, Christian, et al. "Speeding Up Queries in Column Stores." *Data Warehousing and Knowledge Discovery Lecture Notes in Computer Science* (2010): 117-29. Web. Apr. 21, 2016.

Lu, Andy. "SAP HANA Concurrency Control." *SAP Community Network.* Oct. 28, 2014. Web. Apr. 22, 2016. 4 pages. <http://scn.sap.com/docs/DOC-57101>.

Mumy, Mark. "SAP Sybase IQ 16.0 Hardware Sizing Guide," *SAP Community Network.* May 12, 2013. Web. Apr. 21, 2016. 25 pages. <http://www.sdn.sap.com/irj/scn/go/portal/prtroot/docs/library/uuid/c0836b4f-429d-3010-a686-c35c73674180?QuickLink=index&overridelayout=true&58385785468058>.

Ailamaki, et al., "Weaving Relations for Cache Performance," Proceedings of the the Twenty-Seventh International Conference on Very Large Data Bases, Sep. 11-14, Orlando, FL, Jan. 1, 2001.

Hector Garcia-Molina, et al., "Database Systems The Second Complete Book Second Edition—Chapter 13—Secondary Storage Management," *Database Systems the Complete Book, second edition,* Jun. 15, 2008.

\* cited by examiner

| Page Header | Page No. Starting RowID | Row Count Column Count | Column Info | ... | Column Info | Column 1 | Column 2 | Column 3 | ... |

905 — Page Header / Page No. / Starting RowID
910 — Row Count / Column Count / Column Info
915 — Column 1, Column 2, Column 3, ...

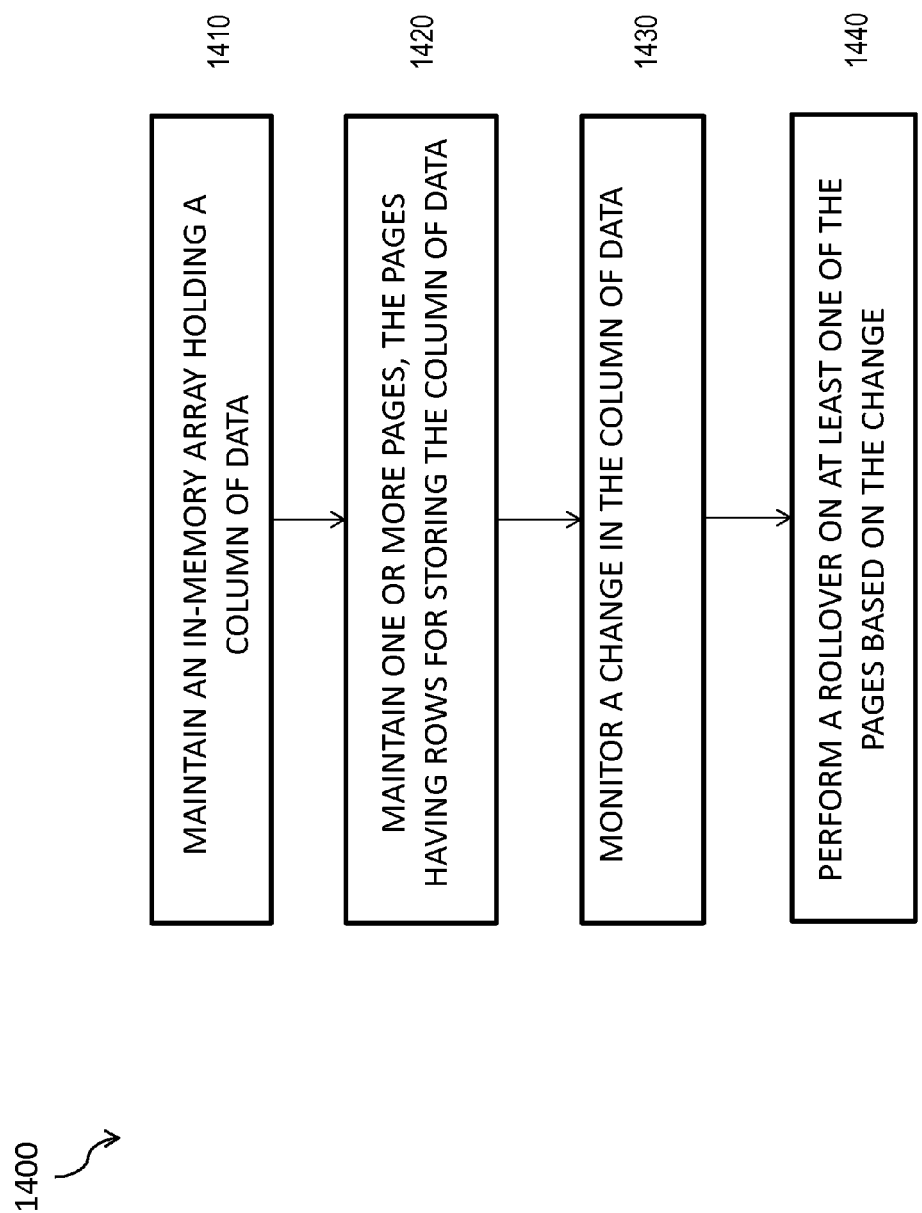

OPTIMIZED ROLLOVER PROCESSES TO ACCOMMODATE A CHANGE IN VALUE IDENTIFIER BIT SIZE AND RELATED SYSTEM RELOAD PROCESSES

TECHNICAL FIELD

This disclosure relates generally to database storage and, in particular, to the reformatting of an on-disk page due to a rollover or a change in the bit size of an encoded value identifier in an in-memory array.

BACKGROUND

Database sizes supported by commercially available database management systems (DBMS) continue to grow as the availability and cost per unit storage of disk-based storage and system memory increases. In general, a database can feature on-disk storage of data, in which data records are stored in one or more tables or other database structures on storage media (e.g. hard disks, optical storage, solid state storage, or the like) and read into main system memory as needed to respond to queries or other database operations. Alternatively, a database can feature in-memory storage of data, in which data records are stored in main system memory. As costs of main system memory continue to decrease, the feasibility of significant use of in-memory features increases. However, data capacity requirements of database systems also continue to increase. As such, hybrid approaches that involve features of both in-memory and on-disk systems are also advantageous.

SUMMARY

Methods and apparatus, including computer program products, are provided for reformatting a page due to a rollover.

In one aspect, an in-memory array holding a column of data is maintained. One or more pages are also maintained. Each of the one or more pages has one or more rows for storing the column of data. The column of data in the in-memory array is monitored for a change. A rollover is performed on at least one of the one or more pages based on the change. The rollover reformats the at least one page by rewriting metadata associated with the at least one page.

The above methods, apparatus, and computer program products may, in some implementations, further include one or more of the following features.

The change can be an increase in a number of bits in a plurality of values in the column of data.

The rollover can be performed only on pages that have not materialized. A page can be materialized when a plurality of values in the column of data is copied from the in-memory array to the page.

Whether the rollover requires one or more additional pages to accommodate the reformatting can be determined. The one or more additional pages can be allocated before the rollover is performed.

The performing the rollover can include creating a new set of pages, formatting the new set of pages based on the rollover, materializing data from the in-memory array to the new set of pages, linking a last non-rolled over page to the new set of pages, and deleting the at least one page.

The at least one page can be loaded to the in-memory array during a system restart.

The loading can include adding a new column to the in-memory array. A plurality of values in the new column can be populated with at least one of a null value and a default value.

The loading can also determine whether the column in the in-memory array has been deleted. Data may not be copied from the at least one page based on the determining.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The subject matter described herein provides many technical advantages. For example, in some implementations, when the bit size of a value identifier changes (e.g., increases in size), then the corresponding representation of the value identifier in an in-memory array and on one or more pages can also change. This change can, for example, reformat the pages. In some implementations, the reformatting process can be limited to unmaterialized pages. Excluding materialized pages from this process can prevent the rewriting of materialized data already persisted to disk. Other implementations of the instant subject matter provide processes for reloading a system from persisted data. These processes can account for system irregularities including, for example, any mismatch in column data between the in-memory array and a materialized page.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated herein and constitute a part of this specification, show certain aspects of the subject matter disclosed herein and, together with the description, help explain some of the principles associated with the subject matter disclosed herein. In the drawings.

FIG. 9 is a schematic representation of a page;

FIG. 14 is a flowchart for performing a rollover.

Like reference symbols in the various drawings indicate like elements.

DETAILED DESCRIPTION

The current subject matter includes a number of aspects that can be applied individually or in combinations of one or more such aspects to support a unified database table approach that integrates the performance advantages of in-memory database approaches with the reduced storage costs of on-disk database approaches. The current subject matter can be implemented in database systems using in-memory OLAP, for example including databases sized at several terabytes (or more), tables with billions (or more) of rows, and the like; systems using in-memory OLTP (e.g. enterprise resource planning or ERP system or the like, for example in databases sized at several terabytes (or more) with high transactional volumes; and systems using on-disk OLAP (e.g. "big data," analytics servers for advanced analytics, data warehousing, business intelligence environments, or the like), for example databases sized at several petabytes or even more, tables with up to trillions of rows, and the like.

Further, the current subject matter is related and is directed to many aspects as described herein and, in addition, in the following patent application filed concurrently herewith on Nov. 25, 2014 entitled: "In-Memory Database System Providing Lockless Read and Write Operations for OLAP and OLTP Transactions" by inventors Anil Kumar Goel, Ivan Schreter, Juchang Lee, Mihnea Andrei (attorney docket number 54874-063F01US/141088US01), the contents of which are hereby fully incorporated by reference.

Figure 1:
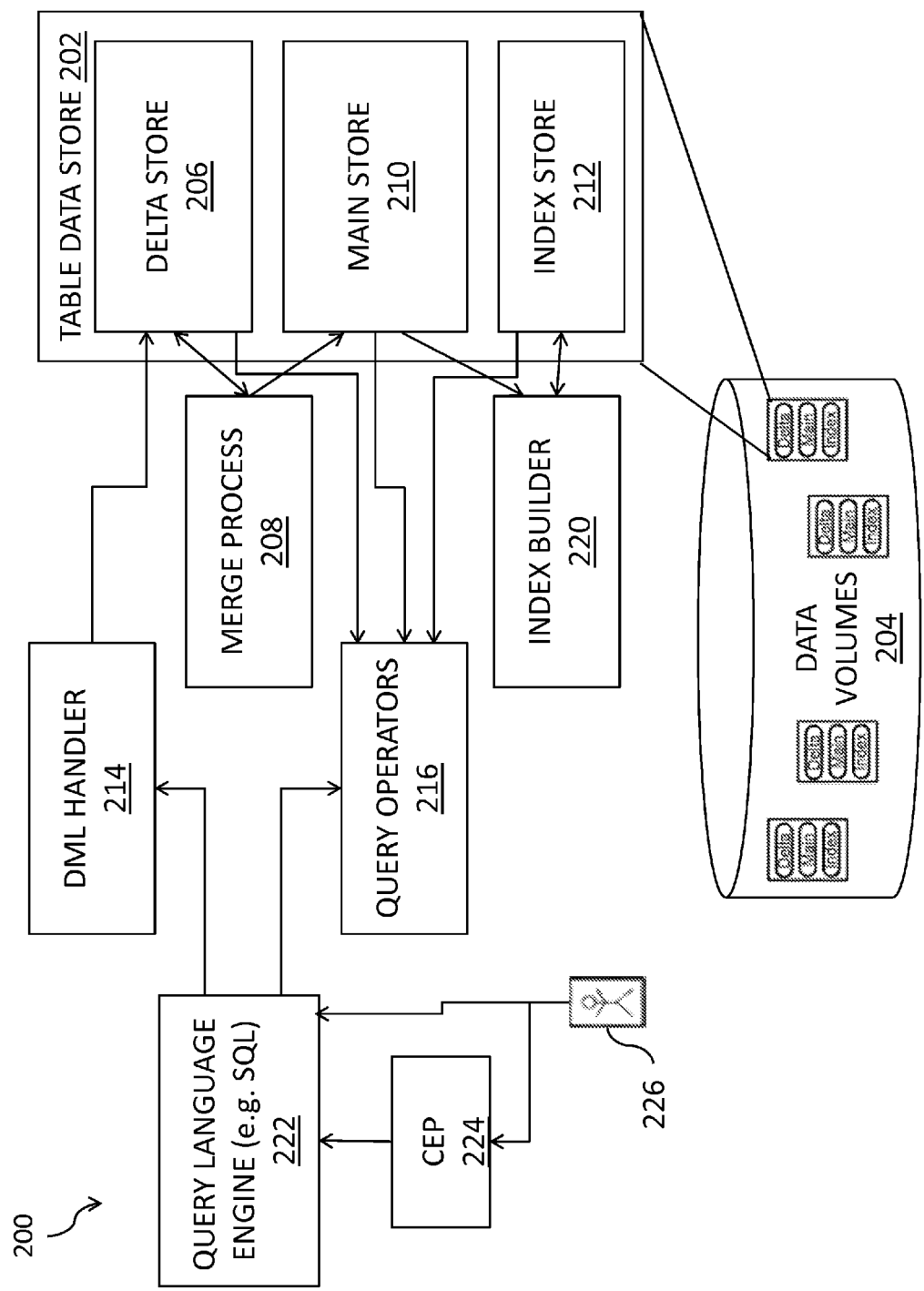
FIG. 1 is a diagram illustrating features of a business software system architecture.

The current subject matter can be implemented as a core software platform of an enterprise resource planning (ERP) system, other business software architecture, or other data-intensive computing application or software architecture that runs on one or more processors that are under the control of a specific organization. This arrangement can be very effective for a large-scale organization that has very sophisticated in-house information technology (IT) staff and for whom a sizable capital investment in computing hardware and consulting services required to customize a commercially available business software solution to work with organization-specific business processes and functions is feasible. FIG. 1 shows a diagram 100 of a system consistent with such an implementation. A computing system 110 can include one or more core software platform modules 120 providing one or more features of the business software system. The computing system can also aggregate or otherwise provide a gateway via which users can access functionality provided by one or more external software components 130. Client machines 140 can access the computing system, either via a direct connection, a local terminal, or over a network 150 (e.g. a local area network, a wide area network, a wireless network, the Internet, or the like).

A database management agent 160 or other comparable functionality can access a database management system 170 that stores and provides access to data (e.g. definitions of business scenarios, business processes, and one or more business configurations as well as data, metadata, master data, etc. relating to definitions of the business scenarios, business processes, and one or more business configurations, and/or concrete instances of data objects and/or business objects that are relevant to a specific instance of a business scenario or a business process, and the like. The database management system 170 can include at least one table 180 and additionally include parallelization features consistent with those described herein.

Figure 2:
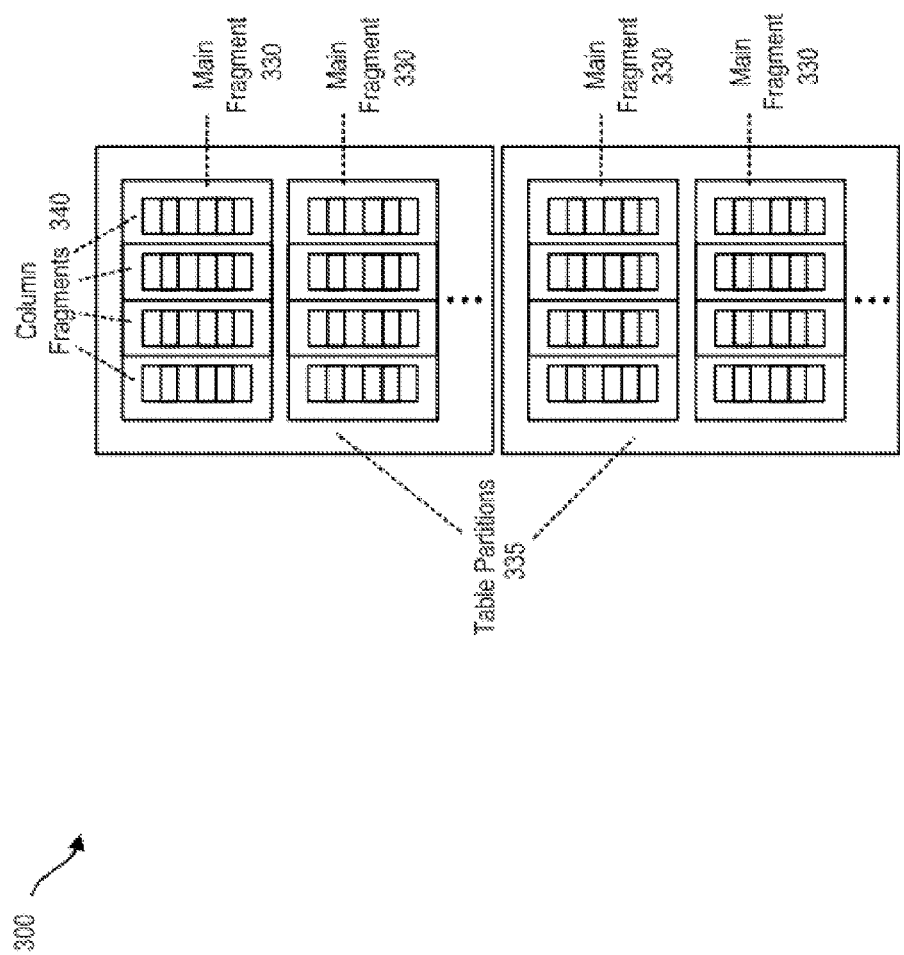
FIG. 2 is another diagram illustrating features of a business software system architecture.

FIG. 2 shows a block diagram of an architecture 200 illustrating features that can be included in a database or database management system consistent with implementations of the current subject matter. A table data store 202, which can be retained among a plurality of data volumes 204, can include one or more of a delta store 206 (e.g. a paged delta part, which can optionally be OLTP optimized and can optionally include a merge process 208), an index store 212 (e.g. one or more segmented indices), and a main store 210. The main store 210 can include a main part that is fragmented consistent with features described herein.

Figure 3:
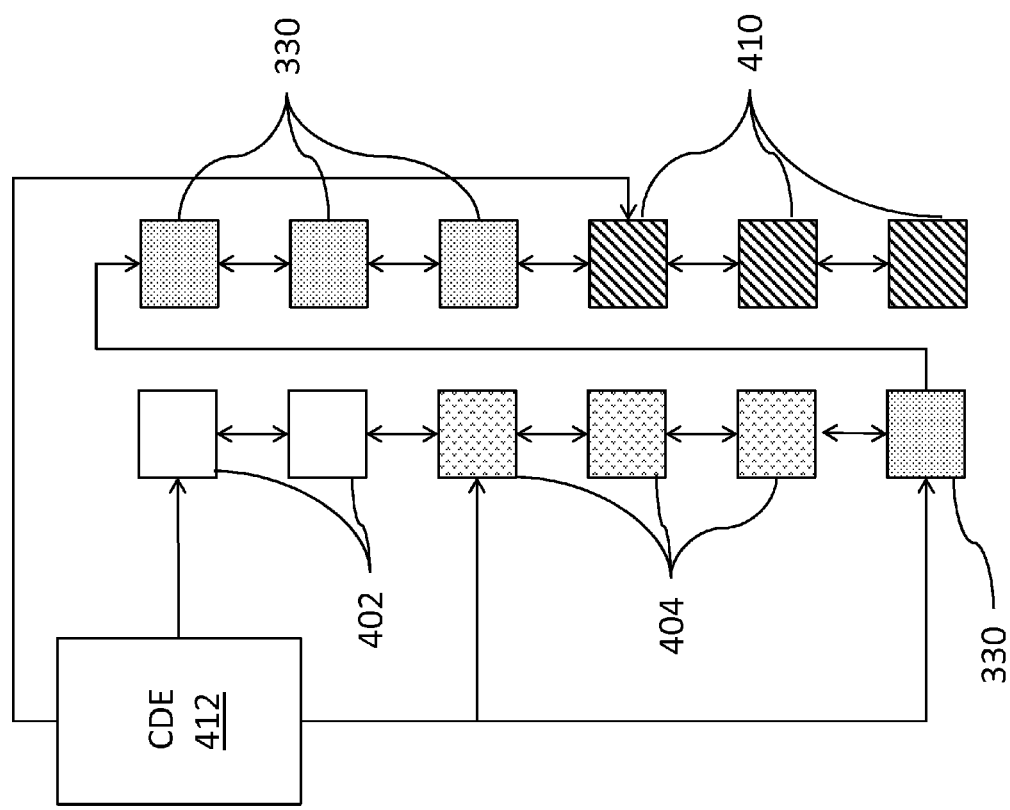
FIG. 3 is a schematic representation of fragments stored in a main store.

To achieve a best possible compression and also to support very large data tables, a main part of the table can be divided into one or more fragments. FIG. 3 shows a schematic representation 300 of the various fragments stored in main store 210. One or more main fragments or fragments 330 can be used for each table or column of a database. Small, manageable tables can be represented with a single fragment. Very large tables can be split into two or more table partitions 335. Each table partition may, in turn, include two or more fragments 330. Fragments 330 can be horizontal slices of the table to which they belong. Each fragment 330 can include one or more column fragments 340. Each column fragment 340 can have its own dictionary and value ID array consistent with the features described herein.

Fragments 330 can advantageously be sufficiently large to gain maximum performance due to optimized compression of the fragment and high in-memory performance of aggregations and scans. Conversely, such fragments can be sufficiently small to load a largest column of any given fragment into memory and to sort the fragment in-memory. Fragments can also be sufficiently small to be able to coalesce two or more partially empty fragments into a smaller number of fragments. As an illustrative and non-limiting example of this aspect, a fragment can contain one billion rows with a maximum of 100 GB of data per column. Other fragment sizes are also within the scope of the current subject matter. A fragment can optionally include a chain of pages. In some implementations, a column can also include a chain of pages. Column data can be compressed, for example using a dictionary and/or any other compression method. Table fragments can be materialized in-memory in contiguous address spaces for maximum performance. All fragments of the database can be stored on-disk, and access to these fragments can be made based on an analysis of the data access requirement of a query.

Referring again to FIG. 2, other parts of the architecture 200 can include a data manipulation language (DML) handling module or similar functionality 214, one or more query handling modules or similar functionality 216 (e.g. including multi-version concurrency control), an index builder 220 that supports the index store 212, a query language engine 222 (which can, for example, be a SQL engine), a complex events processing module (e.g. an event handler, a stream processing module, etc.) 224 for receiving inputs from a user 226, and the like.

Figure 4:
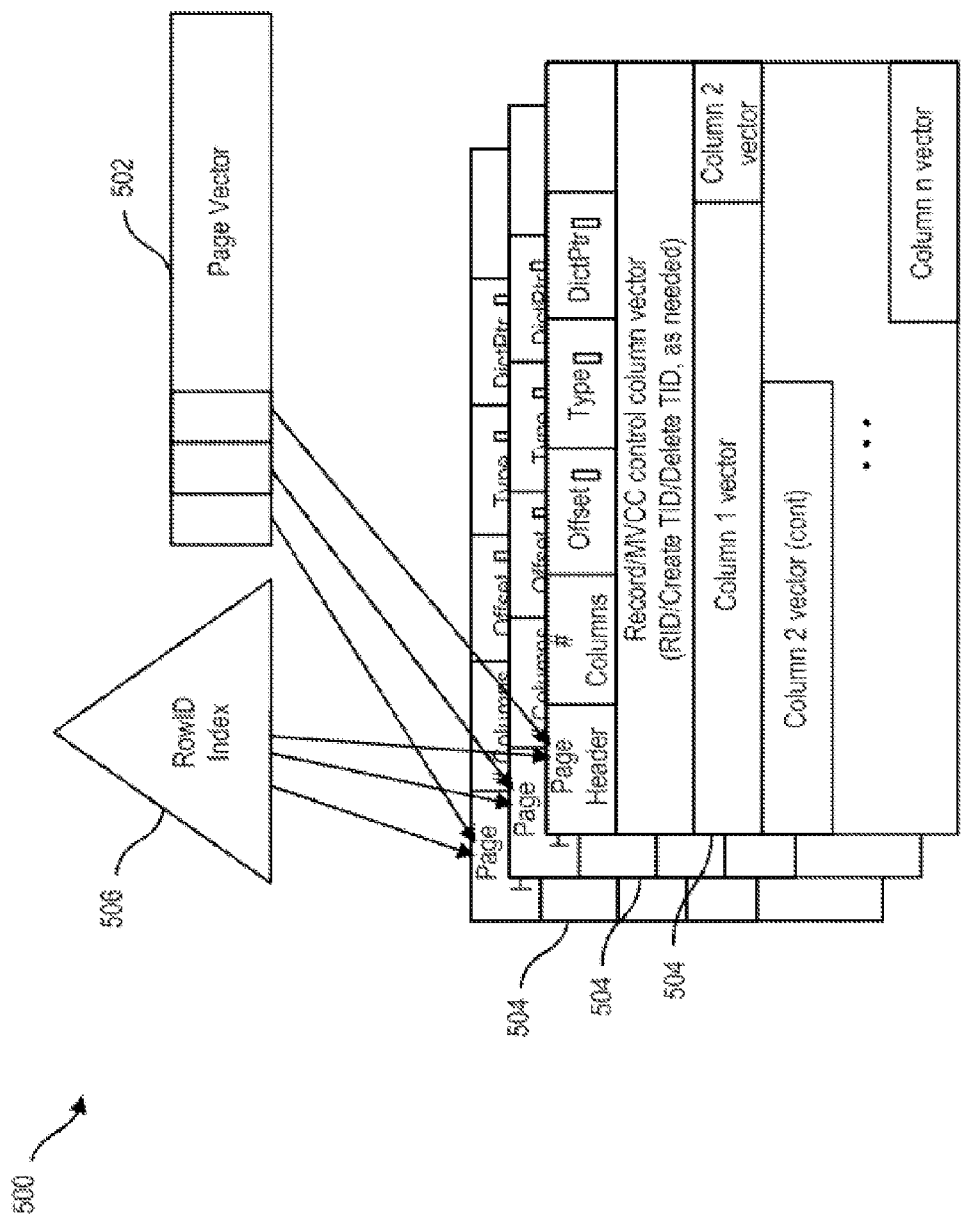
FIG. 4 is a diagram illustrating features of a unified table container page chain.

FIG. 4 shows a block diagram illustrating an example of a unified table container page chain 400. As described above, each fragment can optionally include a chain of pages. In general, a container can be represented as a page chain. A page chain can generally be characterized as a set of pages that are linked in a given order. The term pages, as used herein, refers to a basic unit of storage in a database. A page size is generally established when the database is built and typically cannot be changed. A representative page size can be on the order of 2 kB, 4 kB, 8 kB, 16 kB, or the like. Once the server is built, the value usually cannot be changed. Different types of pages can store different types of database objects. For example, data pages can store data rows or columns for a table. Index pages can store index rows for one or more levels of an index. Large object (LOB) pages can store data for text and image columns, for Java off-row columns, and the like. While FIG. 4 illustrates a single page chain 400, multiple page chains can be used. In some implementations, the multiple page chains can be arranged in accordance with a hierarchy.

Also as shown in FIG. 4, sub-chains of the page chain can be defined for a delta part, a main part, dictionaries, index segments (optionally, not shown in FIG. 2), and the like such that a "whole" of each of these entities contains one or more pages. In some implementations of the current subject matter, a delta part can include both "hot" delta fragments 402 and "cold" delta fragments 404, which can be stored separately. The main part can also be subdivided into main fragments 330. Pages containing dictionary-compressed columnar data 410 can refer to pages containing dictionaries for them. Individual table parts can be loaded into main memory on-demand. A merge process can be decoupled from transaction handling such that a merge process can be executed at recovery time (e.g. during log replay). A page chain, such as the example shown in FIG. 4, can be initiated by a container directory entry (CDE) 412.

A single RowID space can be used across pages in a page chain. A RowID, which generally refers to a logical row in the database, can be used to refer to a logical row in an in-memory portion of the database and also to a physical row in an on-disk portion of the database. A row index typically refers to physical 0-based index of rows in the table. A 0-based index can be used to physically address rows in a contiguous array, where logical RowIDs represent logical order, not physical location of the rows. In some in-memory database systems, a physical identifier for a data record position can be referred to as a UDIV or DocID. Distinct from a logical RowID, the UDIV or DocID (or a comparable parameter) can indicate a physical position of a row (e.g. a data record), whereas the RowID indicates a logical position. To allow a partition of a table to have a single RowID and row index space consistent with implementations of the current subject matter, a RowID can be assigned a monotonically increasing ID for newly-inserted records and for new versions of updated records across fragments. In other words, updating a record will change its RowID, for example, because an update is effectively a deletion of an old record (having a RowID) and insertion of a new record (having a new RowID). Using this approach, a delta store of a table can be sorted by RowID, which can be used for optimizations of access paths. Separate physical table entities can be stored per partition, and these separate physical table entities can be joined on a query level into a logical table.

When an optimized compression is performed during a columnar merge operation to add changes recorded in the delta store to the main store, the rows in the table are generally re-sorted. In other words, the rows after a merge operation are typically no longer ordered by their physical row ID. Therefore, stable row identifier can be used consistent with one or more implementations of the current subject matter. The stable row identifiers can optionally be a logical RowID. Use of a stable, logical (as opposed to physical) RowID can allow rows to be addressed in REDO/UNDO entries in a write-ahead log and transaction undo log. Additionally, cursors that are stable across merges without holding references to the old main version of the database can be facilitated in this manner. To enable these features, a mapping of an in-memory logical RowID to a physical row index and vice versa can be stored. In some implementations of the current subject matter, a RowID column can be added to each table. The RowID column can also be amenable to being compressed in some implementations of the current subject matter.

Figure 5:
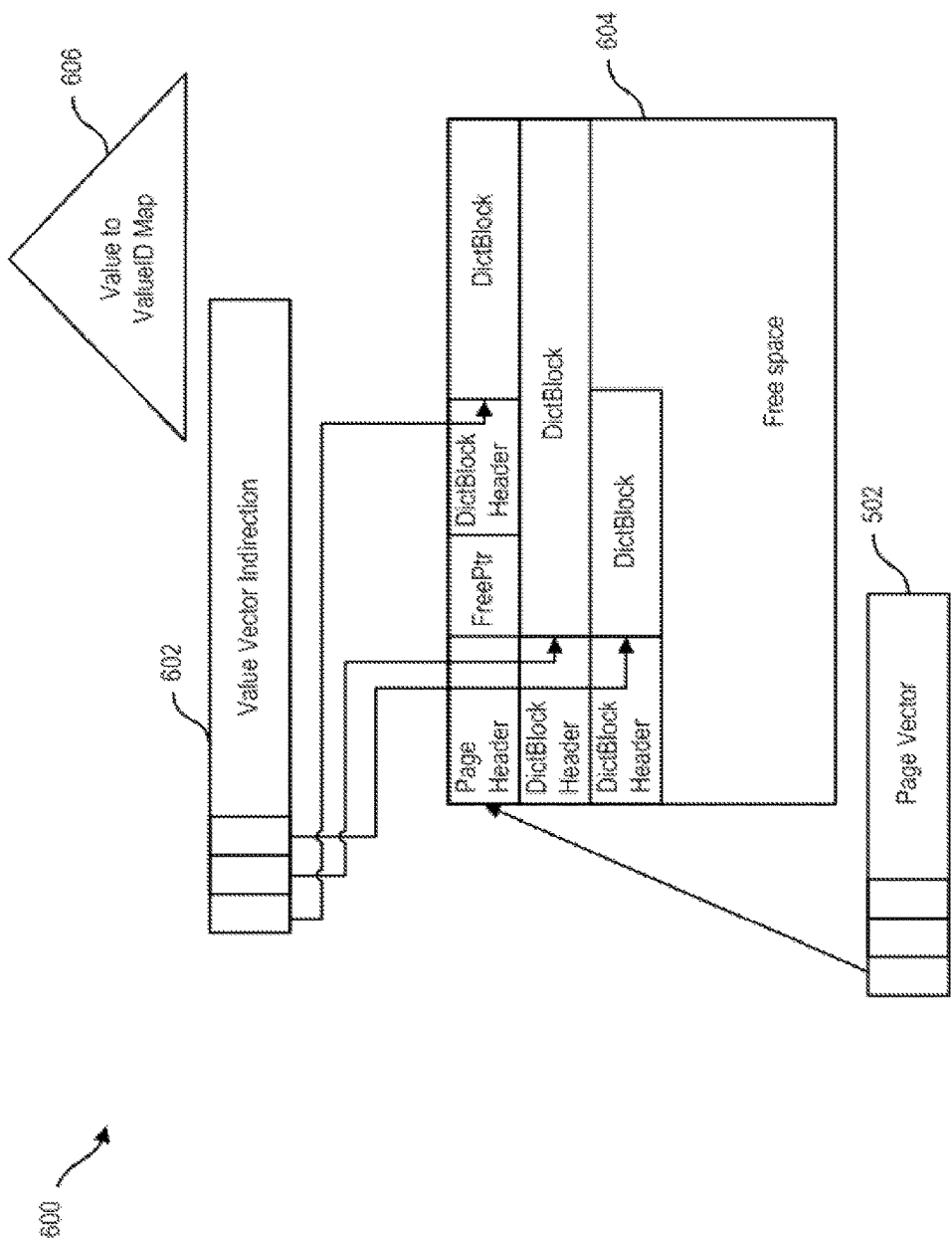
FIG. 5 is a diagram illustrating features of a unified table delta.

FIG. 5 shows a block diagram of a unified table delta 500 consistent with one or more implementations of the current subject matter. In some examples, a "hot" and "cold" delta approach can be used in which uncompressed data are retained in the "hot" delta part, while dictionary-compressed data are retained in the "cold" delta part with a mini-merge performed between the hot and cold parts. Such a delta part can be considered as a single container. As shown in FIG. 5, each delta sub-chain can have its own transient structure. In other words, a separate structure can be used for each delta. A page vector 502 can hold page handles to individual pages 504 and can allow a fast iteration over the pages 504 (for example as part of a column or table scan). A page handle to an individual page 504 can include a pin or the like held in memory. As used herein, the term "pin" refers to holding a particular data page (which may also have been stored on disk) in memory. As an example, if a page is not pinned, it can be cleared from memory. Pinning is typically done on data pages being actively accessed so as to avoid potential performance degradations associated with reading the page from disk into memory.

A RowID index 506 can serve as a search structure to allow a page 504 to be found based on a given interval of RowID values. The search time can be on the order of log n, where n is very small. The RowID index can provide fast access to data via RowID values. For optimization, "new" pages can have a 1:1 association between RowID and row index, so that simple math (no lookup) operations are possible. Only pages that are reorganized by a merge process need a RowID index in at least some implementations of the current subject matter.

Figure 6:
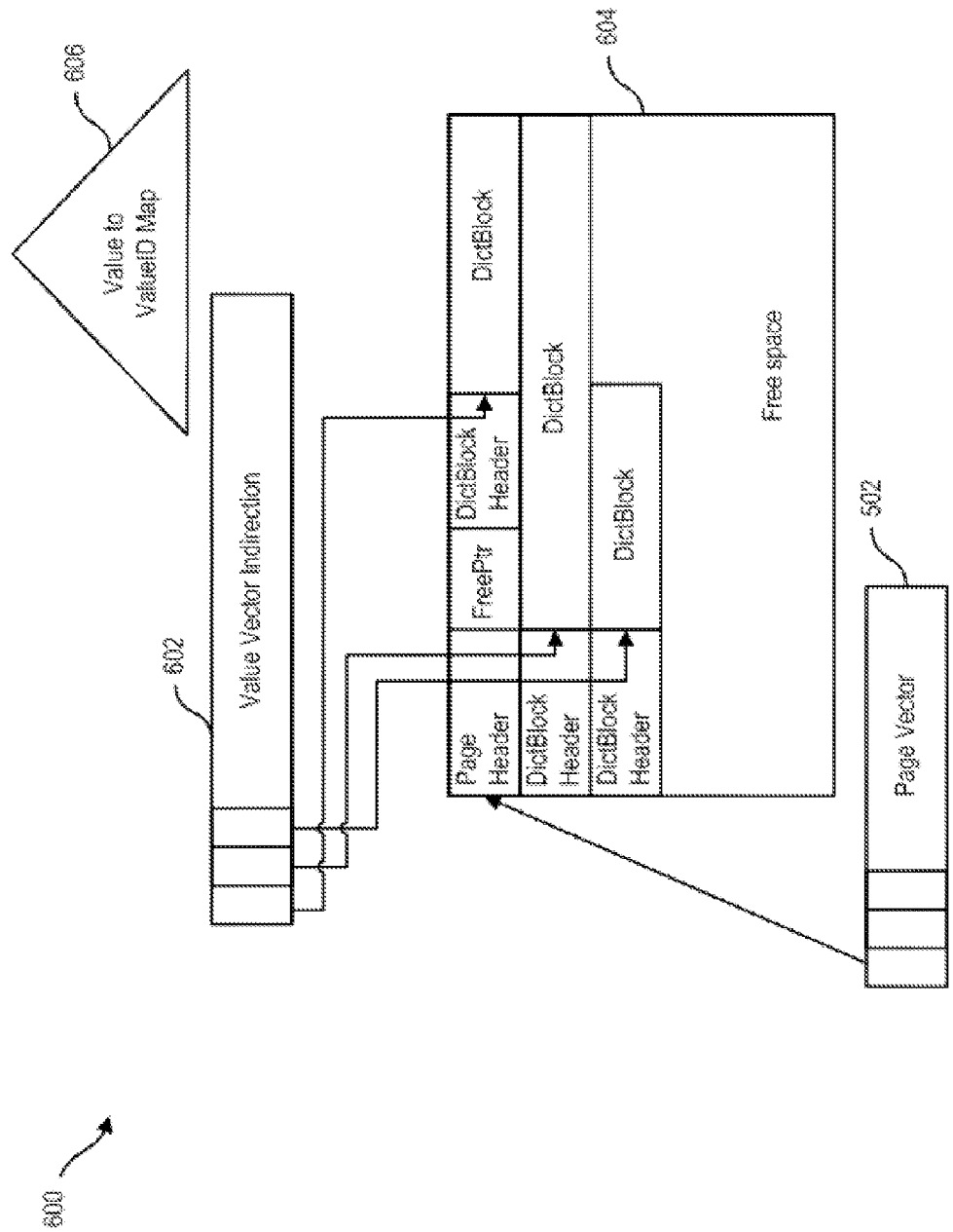
FIG. 6 is a diagram illustrating features of a unified table unsorted dictionary.

FIG. 6 shows a block diagram of a unified table unsorted dictionary 600. Consistent with one or more implementations of the current subject matter, column data in a delta part can use unsorted dictionaries. A transient structure can be provided per delta column dictionary. The page vector 502 can handle pinning of pages in memory. Direct access can be provided via a pointer from other structures. A value vector indirection 602 can allow a same number of values per dictionary block 604. This capability can support an order of 1 performance cost for lookup of a value by ValueID. A dictionary can assign a unique ValueID (typically a numeric value) to each unique value such that the unique values (which are typically larger in memory size than the ValueID) can be stored once rather than multiple times. A value array is a structure used by the dictionary to retrieve values given a ValueID or vice versa. This technique, which can reduce the amount of memory needed to store a set of values where the values are not unique, is typically referred to as dictionary compression. A Value to ValueID map 606 can support hash or B-tree sizes on the order of 1 or on the order of log n for lookup of ValueID by value. A B-tree is a tree data structure that keeps data sorted and allows searches, sequential access, insertions, and deletions in logarithmic time. This capability can be necessary for dictionary compression. A B-tree can be better for range scans but can be more expensive to maintain.

Figure 7:
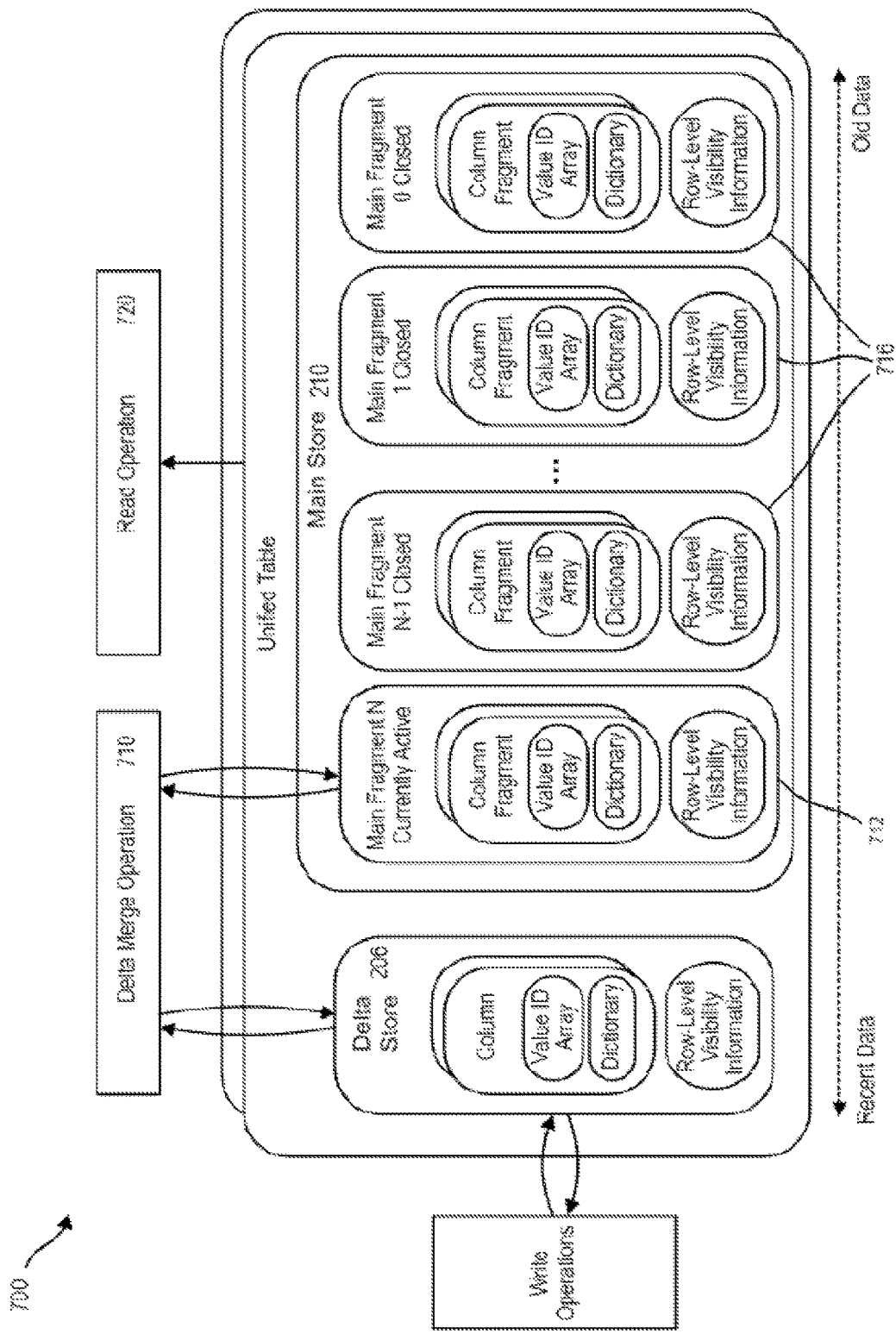
FIG. 7 is a functional block diagram illustrating a delta merge operation and a read operation using a unified table.

FIG. 7 shows a functional block diagram 700 for performing a delta merge operation 710 on a unified table. New transactions or changes can initially be written into delta store 206. Main store 210 can include one active fragment 712 and one or more closed fragments 716. When updates are merged from delta store 206 into the main store 210, existing records in the closed fragments 716 cannot be changed. Instead, new versions of the records can be added to the active fragment 712, and old versions can be marked as invalid.

Functional block diagram 700 also illustrates a read operation 720. Generally, read operations can have access to all fragments (i.e., active fragment 712 and closed fragments 716). Read operations can be optimized by loading only the fragments that contain data from a particular query. Fragments that do not contain such data can be excluded. In order to make this decision, container-level metadata (e.g., a minimum value and/or a maximum value) can be stored for each fragment. This metadata can be compared to the query to determine whether a fragment contains the requested data.

Figure 8:
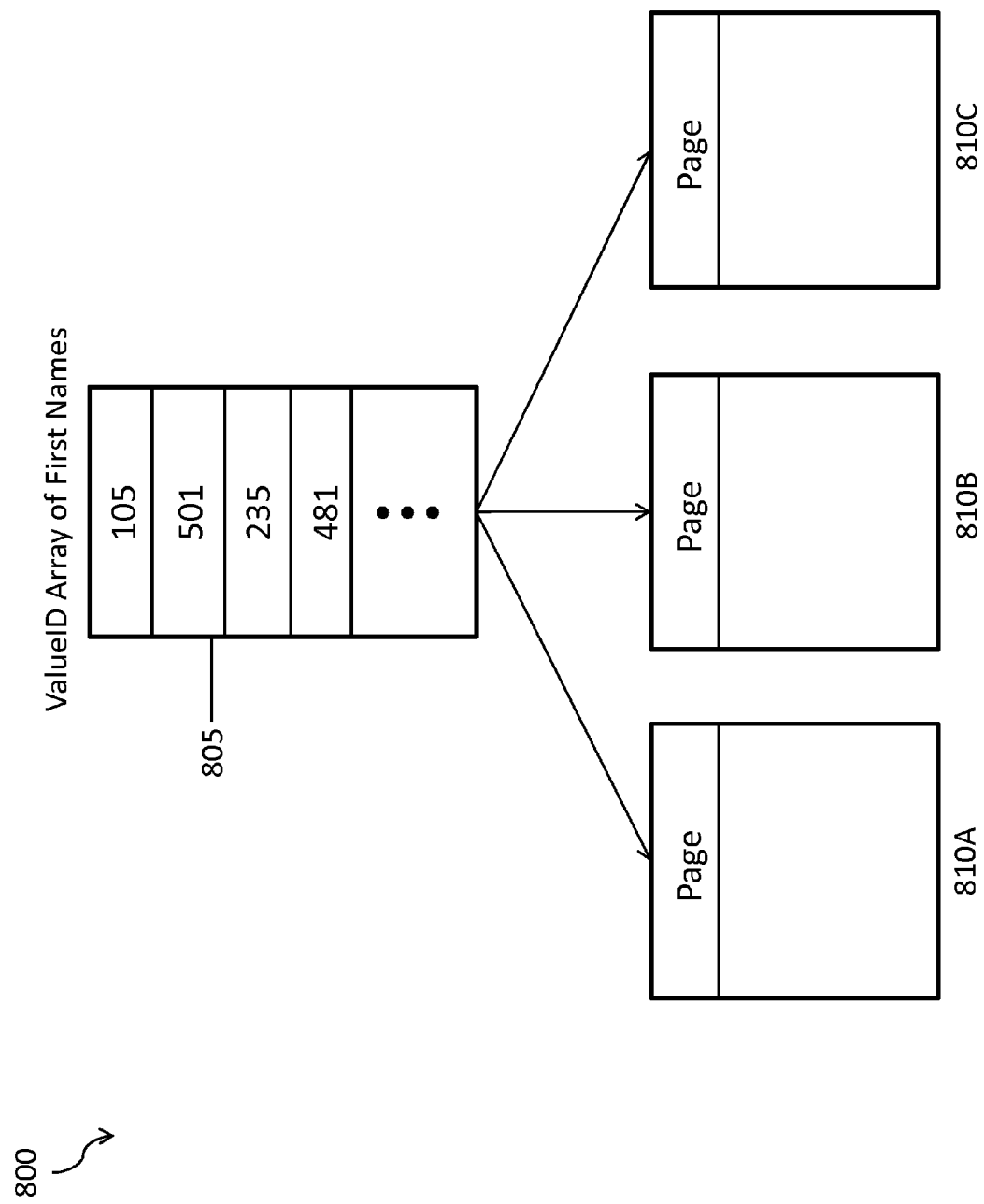
FIG. 8 is a functional block diagram of a system architecture having a memory array and an on-disk page structure.

FIG. 8 is a functional block diagram of a system architecture 800 consistent with implementations of the current subject matter. System 800 combines the benefits of a traditional disk/page based system with the fast memory access available in an in-memory database system, such as SAP's High Performance Analytic Appliance (HANA) database system. System 800 can include an in-memory array, such as memory array 805, that can store data associated with a column of a table. In some implementations, the memory array 805 can include contiguous blocks of memory addresses. While the memory array 805 is illustrated as having a single column in the implementation of FIG. 8, any number of columns can be included. Each memory address can include a value. This value can be a ValueID that is representative of a data value, such as a first name as illustrated in the implementation of FIG. 8. The memory array 805 can also include a starting memory address associated with the first element 807 in the memory array that can be stored as metadata. Once the starting memory address is known, transaction threads can quickly scan, search, or read the memory array 805 as each element in the memory array is sequentially stored at adjacent memory addresses.

Reading and writing individual pages (or blocks of rows on a given page), however, can be problematic when some of the data is not in the memory array 805. In an in-memory database system, such as HANA, the in-memory array can be persisted to disk in a serial manner using a series of pages. Because this data is serially written to disk by breaking the data up across one or more pages, there may be no correlation between the data and the page that it is on. As such, random access to a particular data value or ValueID may not be supported. If, for example, only a specific ValueID is needed during a read or write operation, the entire sequence of pages may be loaded into the in-memory array which can be time consuming.

In order to overcome this deficiency, implementations of the current subject matter mirror the memory array 805 into a separate page based layout, such as pages 810A, 810B, and 810C, when persisting the memory array to disk. Using pages 810A, 810B, and 810C allows system 800 to take advantage of the disk optimized features associated with a disk/page based system. Pages 810A, 810B, and 810C support a lookup mechanism that can track the location of pages in memory. This lookup mechanism can be helpful because pages 810A, 810B, and 810C may not be sequentially stored in memory. In some implementations, this lookup mechanism can use a hash table that correlates page numbers and the contents of each page to memory addresses. Because individual pages can be easily located via this lookup mechanism, system 800 can load individual pages or blocks of rows on individual pages into the memory array 805. This capability can be useful during a system restore process. If, for example, a specific row of data or a subset of rows needs to be restored to the memory array 805 after the system 800 shuts down, this subset of rows can be copied and loaded from at least one of pages 810A, 810B, and 810C. Unlike an in-memory database system which may require all of the rows on pages 810A, 810B, and 810C to be loaded to the memory array 805, implementations of the instant subject matter support random access of data. As such, only the desired subset of rows may be loaded into the memory array 805. Mirroring the memory array 805 into pages 810A, 810B, and 810C paginates the memory array in a manner that supports random access of individual pages and individual rows on pages without requiring the system 800 to serialize all of the data when loading the data back to the memory array.

FIG. 9 illustrates a schematic representation of a page 900. Page 900 includes a page header 905 that provides general information regarding the page. This information can include, for example, the page number, the RowID value of the first row, the number of rows and/or columns on the page 900, and the like. Page 900 can also include several fields that hold column information 910. Generally, each column has its own column information field 910. The column information field 910 can include information representative of the column including, for example, a column identifier, the type of encoding present in the column, the location of the corresponding column data on the page, and the like. Page 900 can also include blocks 915 of column data. Because column data blocks 915 store data of varying size, the column data blocks can also vary in size. In some implementations, page 900 may not include any blocks 915 of column data at all. In these implementations, the metadata in the column information field 910 may be sufficient to reconstruct the data in memory. This scenario can occur when all of the values in the column are set to null or 0. This scenario can also occur when the column information field 910 of a column indicates that an identity property applies to the column. As described above with respect to FIG. 8, the data (i.e., the ValueIDs) in memory array 805 can be copied to pages 810A, 810B, and 810C and stored at various row positions as indicated by column data blocks 915. When the identity property applies, the ValueID may be equal to the row position. For example, a ValueID of 1 may be stored at row position 1 on the page, a ValueID of 2 may be stored at row position 2 on the page, and so on. Because the ValueID is equal to the row position, there may be no need to store the ValueID as it can be reconstructed from the row position. Consequently, the corresponding block 915 of column data may be empty.

The contents of column data blocks 915 can be similar to the contents of memory array 805. As described above with respect to dictionary 600, a dictionary can assign a unique ValueID to each dictionary entry. This unique ValueID is typically a numeric value represented by a string of bits. The number of bits used to represent the ValueID (i.e., the N-bit value ID) can depend on the number of unique values in the dictionary. Like dictionary 600, the data stored in memory array 805 can also include N-bit value IDs. When the data values in memory array 805 are copied to pages 810A, 810B, and 810C, the data can be copied directly using its native N-bit encoded values. By keeping these data values in their native N-bit form at both the memory array 805 and the pages 810A, 810B, and 810C, no additional processing or translation is required to convert these data values between different formats (e.g., expanding and compressing the data values to/from a 32-bit integer format). This configuration can allow system 800 to reduce or minimize the amount of time associated with the copying process.

A bit copy mechanism can be used to copy data from memory array 805 to pages 810A, 810B, and 810C. Memory copies generally start at byte boundaries. During these operations, copying may begin at a source byte and end at a destination byte. Sometimes, however, the data to be copied may be located within the middle of a byte or span multiple bytes. For example, in the implementation of FIG. 8, ValueIDs 105, 501, 235, and 481 may be located within a contiguous block within memory array 805 that begins in the middle of a byte. If, for example, copying is limited to byte boundaries, then these values may be truncated. Rather than limit data copying to the byte boundaries, the bit copy mechanism can start the copying process anywhere within the byte. For example, if it is known that ValueIDs 105, 501, 235, and 481 start and end at particular bits, data copying can be limited to these bits. In some implementations, these start and end bits may coincide with the start and end points of a memory byte or may reside within one or more different memory bytes. Bit copy can also facilitate N-bit encoding of ValueIDs. Pages can contain a range of row positions (e.g., a page may have row positions 100 to 200). With N-bit encoding, row position 100 may begin several bits into a given byte or may span multiple bytes. The bit copy mechanism copies row positions 100 to 200 even if these row positions do not coincide with byte boundaries.

A dedicated thread can copy the data values from memory array 805 to one or more of pages 810A, 810B, and 810C. Specifically, this thread can flush the data values from memory array 805 to one or more of pages 810A, 810B, and 810C using different materialization techniques. Data materialization refers to the process by which data values are copied from a memory layout (such as memory array 805) to a page layout (such as pages 810A, 810B, and 810C). When a transaction thread is trying to insert a data value into a table, the transaction thread can write this data value directly into memory array 805. In order to later copy this data value to one of pages 810A, 810B, and 810C, the transaction thread may need to reserve one or more rows on these pages to store this data value. Reserving a row on a page allows data values to be copied to the row at a later time and indicates that the row positions on the page are in use. Upon reserving a row on a page, the transaction thread may mark the page as pending materialization. Each page can have a corresponding control structure that is stored in system memory. This control structure can store information representative of the runtime transient status of the page. This status can include whether the page is ready for materialization and can be represented using a pending materialization bit. The value of the pending materialization bit can indicate whether the page needs to be materialized. Upon determining that a page is pending materialization, the flusher thread can materialize the data and clear the pending materialization bit. By delegating data materialization responsibilities to a dedicated flusher thread, the transaction thread does not have to write data values to both the memory array 805 and to one of pages 810A, 810B, and 810C. This configuration allows the transaction thread to perform its transaction quickly which, in turn, can lead to good system transaction throughput.

In some implementations, a rollover may be required if the number of bits used to represent the N-bit value IDs changes (e.g., increases or decreases). During runtime, various transactions threads can insert new data records into the memory array 805. Each new data record can include, for example, a new first name value. As the number of unique first name values increases, the number of bits used to represent each corresponding N-bit value ID can also increase.

For example, a 1-bit value ID (e.g., 0 or 1) can represent two unique first name values (e.g., David and John). During runtime, transaction threads can add two additional unique first name values (e.g., Eric and Nancy), for example. In order to accommodate the increased number of first name values, additional bits may be needed to uniquely encode each N-bit value ID. In this example, a 2-bit value ID (i.e., 00, 01, 10, or 11) can uniquely represent all four first names. Accordingly, the number of bits used to encode the N-bit value ID can increase from 1 bit to 2 bits as the number of first name values grows.

Figure 10A:
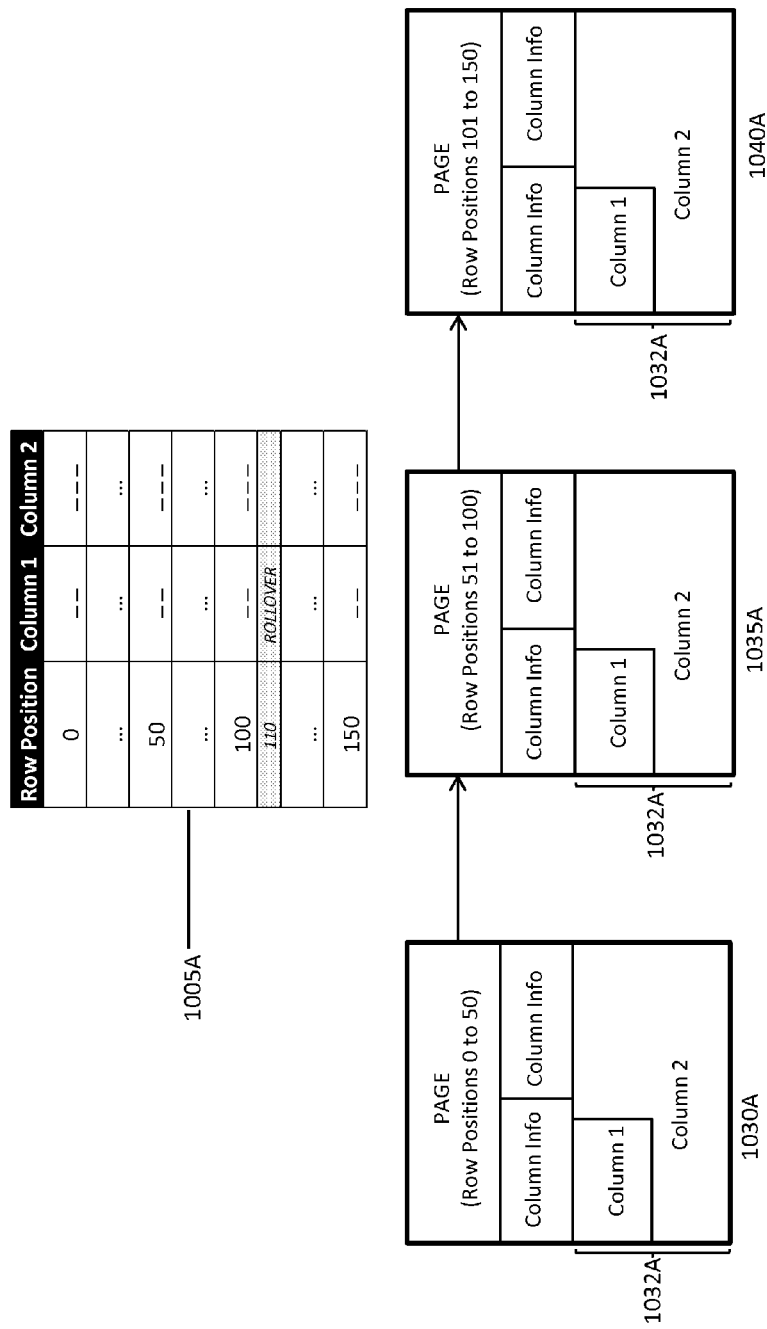
FIGS. 10A and 10B are schematic representations of a memory array and its mirrored pages before and after a rollover process, respectively.
Figure 10B:
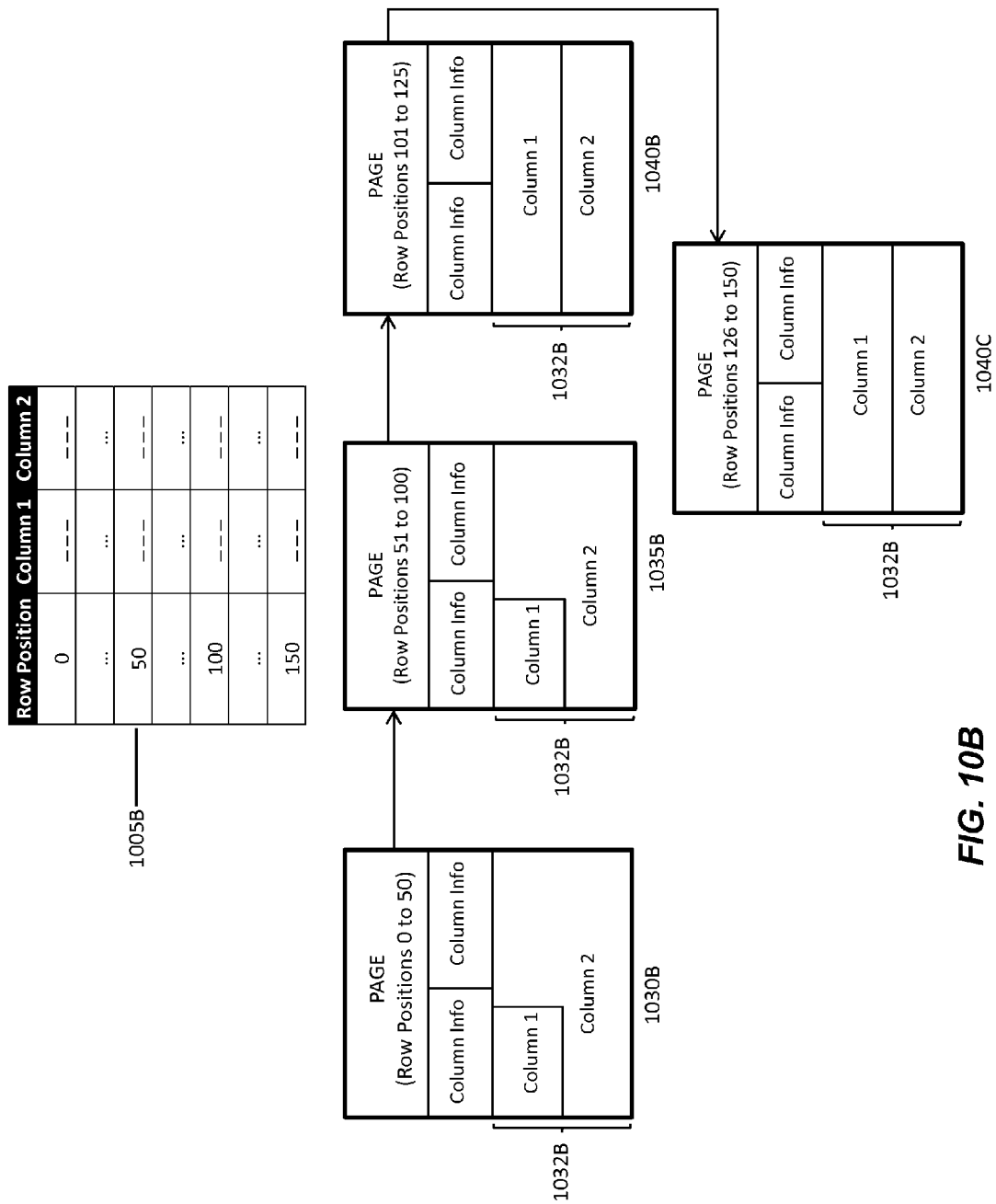

FIGS. 10A and 10B illustrate a schematic representation of a memory array and its mirrored pages before and after a rollover process, respectively. FIG. 10A includes a memory array 1005A that holds two columns (i.e., "Column 1" and "Column 2") of data values for row positions 0 to 150. Before the rollover, column 1 can have 2-bit value IDs. These two bits are represented by two dashes. Column 2 can have 3-bit value IDs, as represented by the three dashes. As described above, the data values in memory array 1005A can be materialized to at least one of pages 1030A, 1035A, and 1040A. Pages 1030A, 1035A, and 1040A can form a chain of pages as illustrated by the arrows in between each page. Page 1030A can accommodate data values in row positions 0 to 50; page 1035A can accommodate data values in row positions 51 to 100; and page 1040A can accommodate data values in row positions 101 to 150. Pages 1030A, 1035A, and 1040A can be laid out to accommodate a 2-bit value ID in column data block area 1032A for column 1 and a 3-bit value ID in the column data block area for column 2.

If the number of bits in a ValueID changes due to a rollover, then the encoded values in the memory array and pages can also change. In the implementation of FIG. 10A, a rollover can occur at row position 110, for example. This rollover can increase the number of bits for the ValueIDs in column 1 from two bits to three bits, for example. As illustrated in FIG. 10B, this rollover can be reflected in memory array 1005B. Specifically, each of the data values in column 1 can include a 3-bit value ID, as represented by the three dashes. The number of bits for the data values in column 2, however, can remain the same as the rollover may only affect the data values in column 1.

The core software platform 120 can propagate the increase in ValueID bit size in column 1 to the mirrored pages. Generally, data that has been materialized to a page is guaranteed to remain unchanged. As such, a rollover can only affect pages that have not been materialized (i.e., pages that are still pending materialization). If, for example, pages 1030B and 1035B have already been materialized, then these pages cannot be affected by the rollover. As illustrated in FIGS. 10A and 10B, the layout of pages 1030A and 1035A can be identical to the layout of pages 1030B and 1035B, respectively. On both sets of pages, the number of rows occupied by column 1 and column 2 in column data block area 1032B can be the same. If, however, page 1040A is pending materialization, then core software platform 120 can reformat this page to accommodate the increase in ValueID bit size. A page can be reformatted by rewriting the metadata on the page which, in turn, can change the way the page is laid out. Metadata can include the contents in the page header and the column information blocks, as described above with respect to FIG. 9. Reformatting a page can change the number of bytes needed to represent the same number of rows of a given column. As illustrated in FIGS. 10A and 10B, the number of rows associated with column 1 in column data block area 1032A on page 1040A can increase such that column 1 occupies more rows (i.e., row positions) in column data block area 1032B on page 1040B. Moreover, because the size of the page is fixed, the capacity of the page (i.e., the number of rows or row positions on the page) can change. Generally, reformatting can cause page capacity to decrease. Given this change in page capacity, the number of rows covered by or included on the page can also change. Generally, the number of rows on the page can decrease. In the implementation of FIGS. 10A and 10B, the number of rows covered by page 1040A can decrease from 50 rows (i.e., row positions 101 to 150) to 25 rows as illustrated on page 1040B (i.e., row positions 101 to 125). Because row positions 126-150 no longer fit on page 1040B, a new page can be allocated to accommodate these rows. In the implementation of FIG. 10B, newly allocated page 1040C can accommodate row positions 126-150.

Figure 11A:
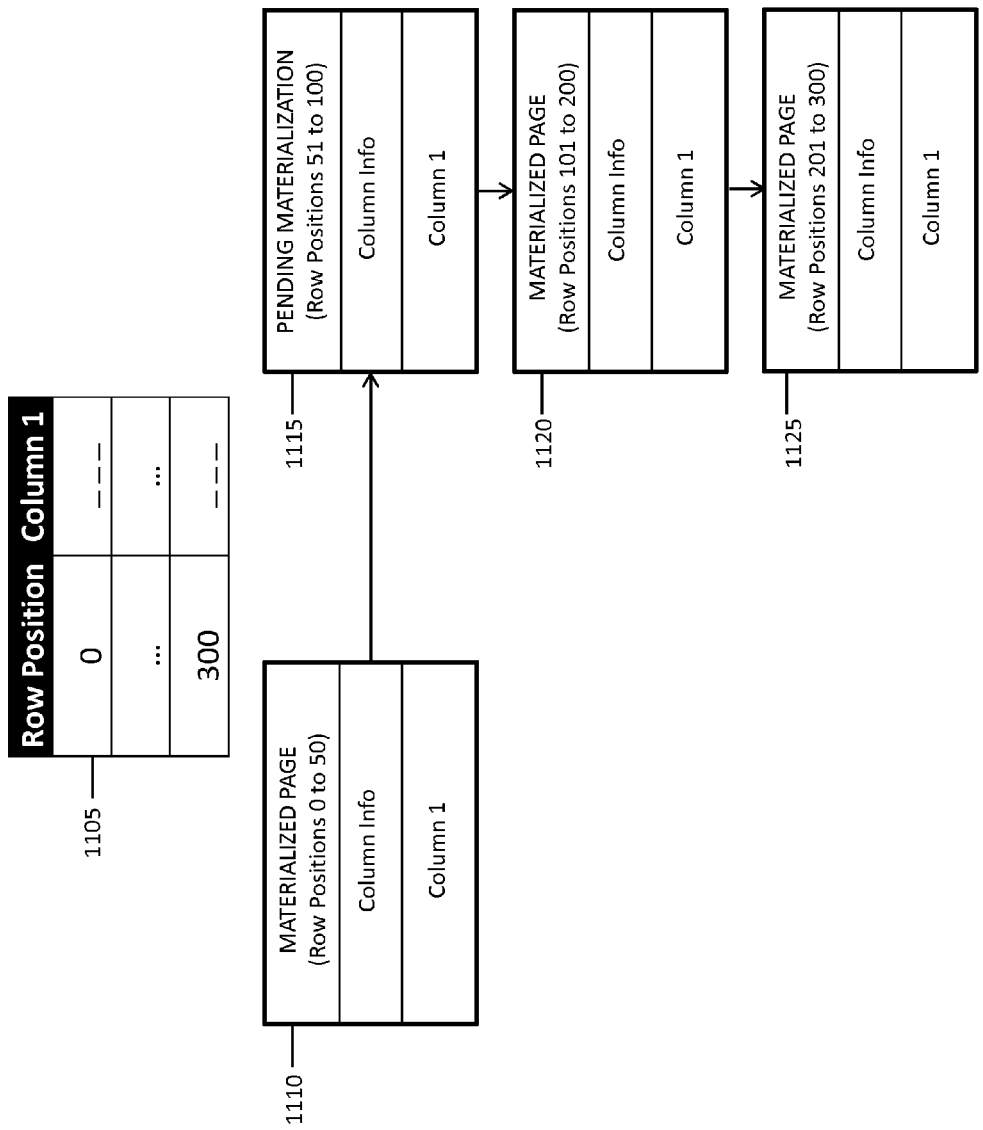
FIGS. 11A and 11B are schematic representations of the effects of a rollover process on materialized pages and processes for reducing these effects.

In some implementations, the rollover of a page can affect already materialized pages. FIG. 11A illustrates a memory array 1105 and pages 1110, 1115, 1120, and 1125. Pages 1110, 1115, 1120, and 1125 can form a chain of pages as illustrated by the arrows in between each page. An in-memory array, such as memory array 1105, can include a single column (i.e., "Column 1") of ValueIDs for row positions 0 to 200. If, for example, the number of bits that represent the ValueIDs in column 1 increases, then a rollover can occur, as described above. In the implementation of FIG. 11A, page 1115 can be pending materialization, while pages 1110, 1120, and 1125 may have already materialized. Rolling over or reformatting page 1115 can change the manner in which this page is laid out. In some scenarios, these changes can have a spillover effect that can impact succeeding pages in the chain, such as pages 1120 and 1125. For example, if the page capacity of page 1115 decreases, then the number of rows on this page can also decrease. This decrease in the number of rows can have a spillover effect onto materialized pages 1120 and 1125.

In order to anticipate this need, the core software platform 120 can be configured to determine the impact of a rollover before it begins reformatting pages. For example, before the core software platform 120 reformats pages 1115, 1120, and 1125, it can first determine whether any additional memory resources (e.g., pages) are needed to accommodate the rollover. The core software platform 120 can make this determination by calculating, for example, the number of rows that may spillover onto a succeeding page, the number of rows on the succeeding page, and whether additional pages are needed to accommodate the spillover rows. Once these additional memory resources are determined and allocated, the core software platform 120 can then reformat pages 1115, 1120, and 1125.

In the implementation of FIG. 11A, the core software platform 120 can reformat page 1115 and materialized pages 1120 and 1125. In some implementations, however, the core software platform 120 can keep materialized pages 1120 and 1125 unmodified. This arrangement can reduce the risk of damaging any persisted data on the materialized pages as illustrated in the implementation of FIG. 11B.

Figure 11B:
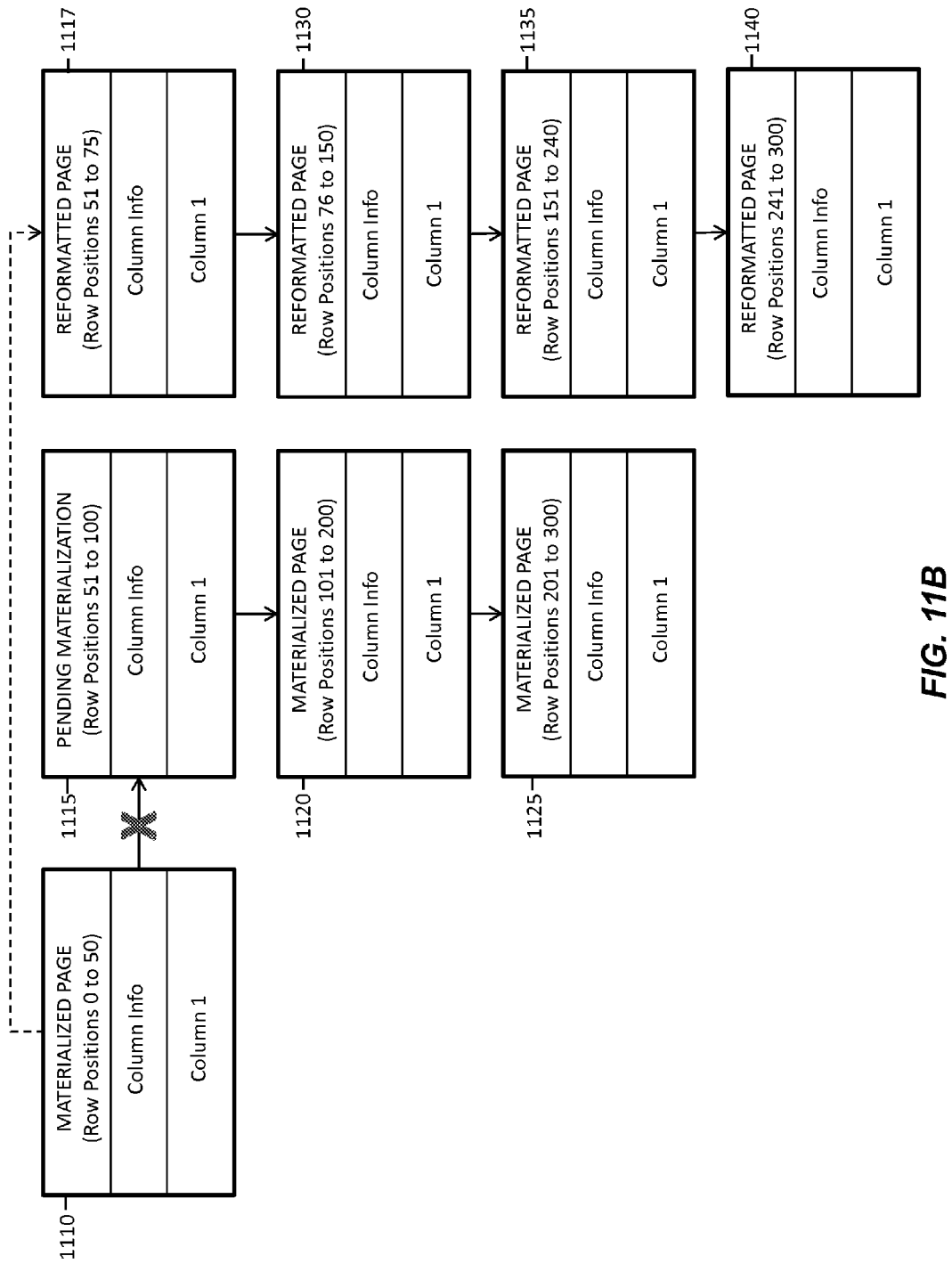

In FIG. 11B, the core software platform 120 can create and format new pages 1117, 1130, 1135, and 1140 in accordance with the post-rollover layout rather than reformat the original pages 1115, 1120 and 1125. The core software platform 120 can determine the impact of the rollover on page 1115 including, for example, the post-rollover layout of pages 1115, 1120, and 1125. In doing so, the core software platform 120 may determine that the capacity of these pages may decrease, for example. Whereas row positions 51 to 300 were spread over three pages (i.e., pages 1115, 1120, and 1125) before the rollover, four pages may be needed after the rollover (i.e., pages 1117, 1130, 1135, and 1140) to account for the decrease in page capacity. Upon making this determination, the core software platform 120 can create new blank pages 1117, 1130, 1135, and 1140 and format these pages in accordance with the post rollover-layout. In the implementation of FIG. 11B, reformatted page 1117 can accommodate row positions 51 to 75; reformatted page 1130 can accommodate row positions 76 to 150; reformatted page 1135 can accommodate row positions 151 to 240; and reformatted page 1140 can accommodate row positions 241 to 300. Page 1110 can remain the same as it may not be affected by the rollover.

After pages 1117, 1130, 1135, and 1140 are formatted, a flusher thread can materialize data from the memory array 1105 to these pages. The flusher thread can use a native N-bit copy mechanism, as described above. In implementations where memory array 1105 does not exist or is otherwise unavailable, the core software platform 120 or a flusher thread can copy the data from the old pages 1115, 1120, and 1125 to the new pages 1117, 1130, 1135, and 1140. This copy process can include a format conversion for any columns having a new format or encoding. For example, if the ValueIDs in column 1 change from a 2-bit encoding in the old pages 1115, 1120, and 1125 to a 3-bit encoding in the new pages 1117, 1130, 1135, and 1140, then the copy process can append an extra bit to the ValueIDs in the new pages. A native N-bit copy mechanism can be used when there is no change in the number of bits in the ValueIDs.

After data is materialized to the new pages 1117, 1130, 1135, and 1140, the core software platform 120 can sever the link between the last non-rolled over page (i.e., page 1110) and original page 1115, as represented by the "X" over the arrow connecting these pages. In its place, the core software platform 120 can create a new link between the last non-rolled over page (i.e., page 1110) and reformatted page 1117, as represented by the dashed arrow connecting these pages. The core software platform 120 can change these links by redirecting a pointer on page 1110 to point to page 1117 instead of page 1115, for example. Once this new link is established, the core software platform 120 can discard pages 1115, 1120, and 1125.

In some implementations, the data on materialized pages can be used to reload or restore the data in the memory array. Referring to FIG. 8, system 800 can be restored by loading persisted transactions from materialized pages 810A, 810B, and 810C back into memory array 805. In some scenarios, however, the data in the materialized pages 810A, 810B, and 810C may not match the data on the memory array 805. These scenarios can occur, for example, when a column is added to or deleted from the memory array after the mirrored pages have materialized. These scenarios can also occur when the N-bit encoding in a memory array is larger than the encoding on the corresponding data page. This mismatch can occur when a rollover is performed on a memory array after its corresponding page has been materialized and unloaded. As a result, the page may have 3-bit value IDs, while the memory array may have 7-bit value IDs. Different processes can be used to account for these mismatches as described below.

Figure 12:
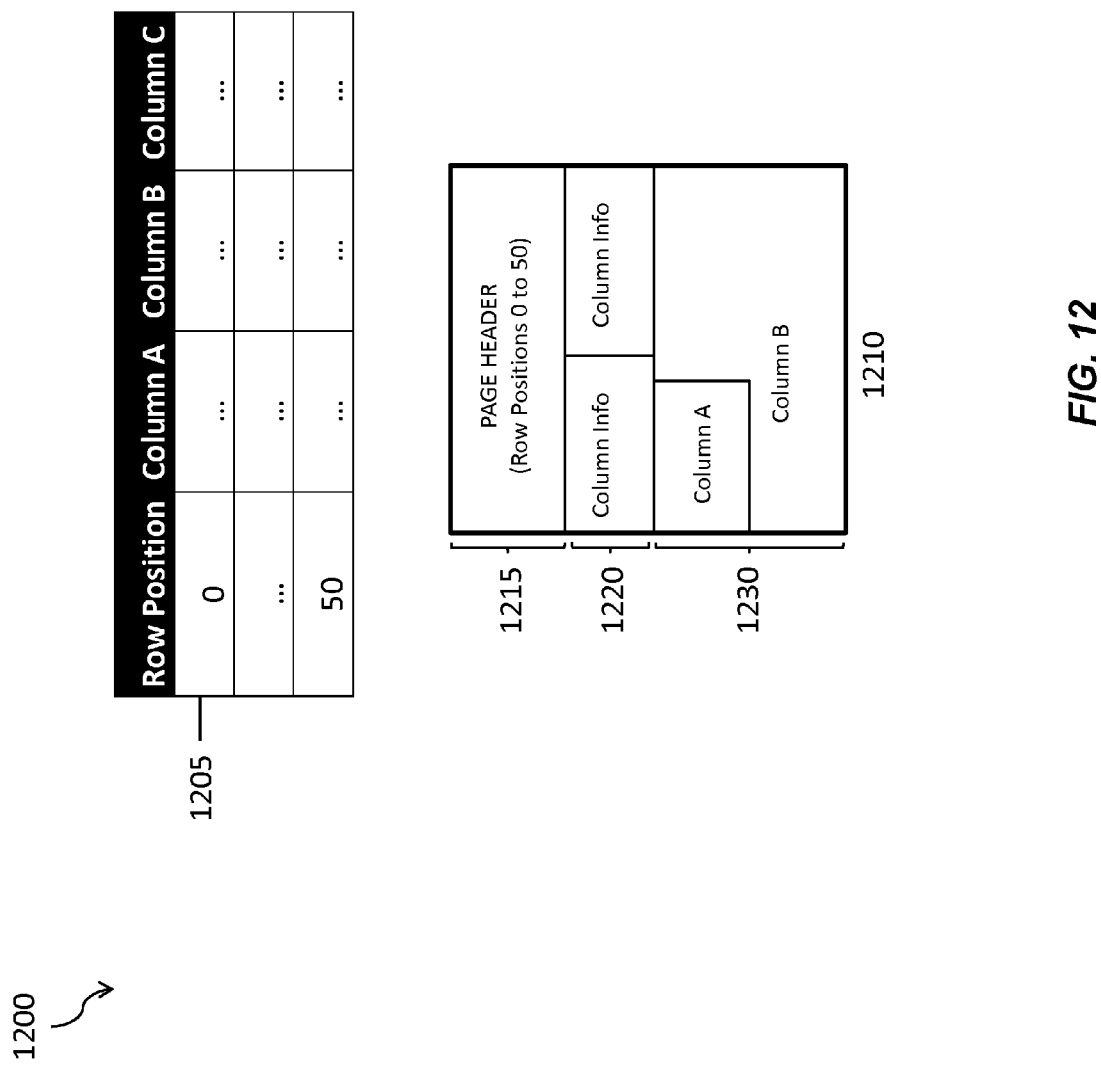
FIG. 12 is a schematic representation of a memory array and its mirrored page during a system reload.

FIG. 12 illustrates a system 1200 that includes a memory array 1205. Memory array 1205 can include three columns of data (i.e., "Column A," "Column B," and "Column C"). System 1200 can also include a page 1210 that can have a page header 1215, column information fields 1220, and column data blocks 1230. When page 1210 is materialized, it can initially contain column information fields 1220 and column data blocks 1230 for columns A and B. Column C may not be included in page 1210 if, for example, a transaction thread added this column to the memory array 1205 after the page was materialized.

During a system reload, the core software platform 120 can compare the column IDs in the column information fields 1220 to the columns in memory array 1205. In doing so, the core software platform 120 can determine that column information fields 1220 can be associated with columns A and B. This determination can be made based on the presence of a column identifier in each column information field 1220. Since memory array 1205 has matching columns A and B, the core software platform 120 can copy the encoded ValueIDs from column data blocks 1230 into the memory array 1205 to reload the contents of these columns.

The above comparison can also yield a mismatched column, however. As described above, memory array 1205 can include a third column C that is absent from materialized page 1210. Because page 1210 lacks a column data block 1230 for column C (and, consequently, lacks any ValueIDs for this column), the core software platform 120 can populate memory array 1205 with a null value or a default value for this column.

Figure 13:
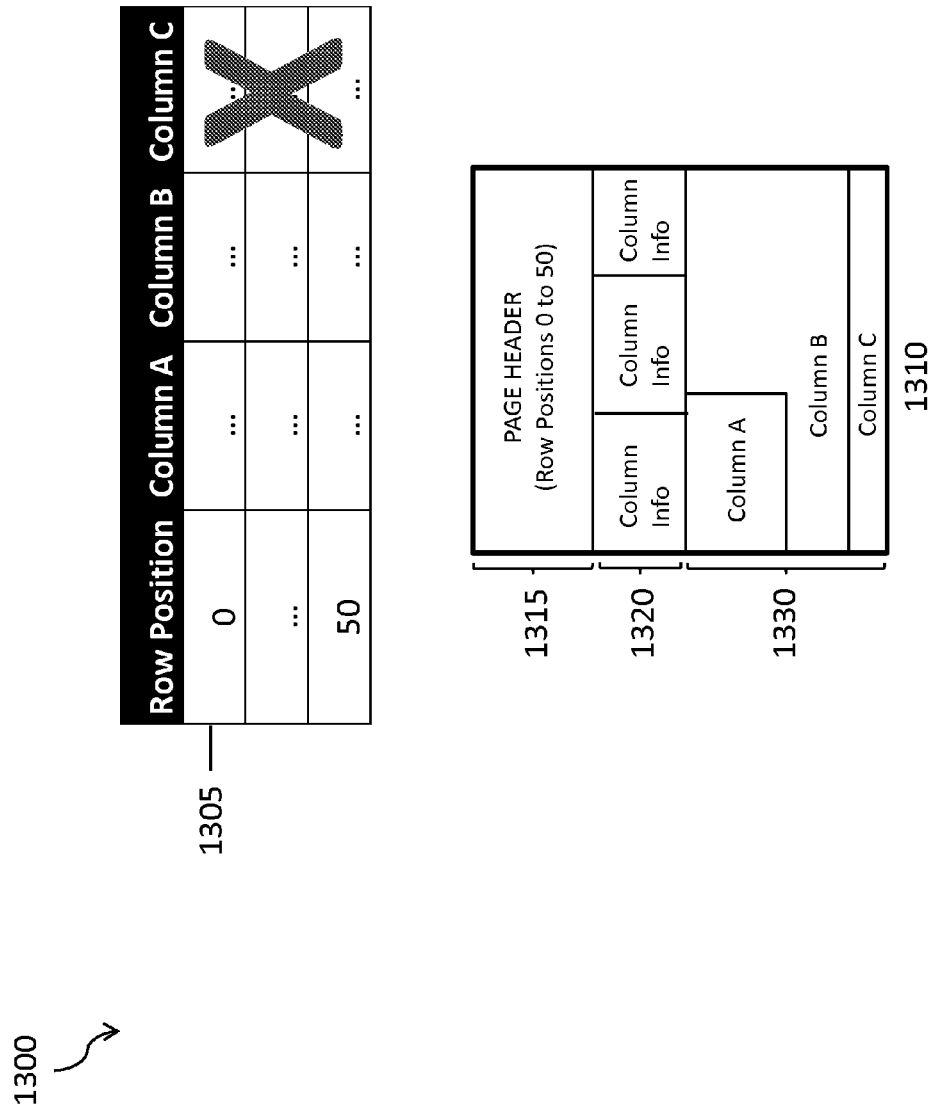
FIG. 13 is another schematic representation of a memory array and its mirrored page during a system reload.

A similar approach can be used to account for deleted columns. FIG. 13 illustrates a system 1300 that can include a memory array 1305. Memory array 1305 can initially include three columns of data (i.e., "Column A," "Column B," and "Column C"). System 1300 can also include a page 1310 that can have a page header 1315, column information fields 1320, and column data blocks 1330. When page 1310 is materialized, it can include column information fields 1320 and column data blocks 1330 for columns A, B, and C. After page 1310 is materialized, a transaction thread can delete column C from the memory array 1305, as represented by the large "X" over this column.

During a system reload, the core software platform 120 can compare the column identifiers in column information fields 1320 to the columns in memory array 1305. In doing so, system 1300 can determine that page 1310 includes column information fields 1320 for columns A, B, and C. Because memory array 1305 also includes columns A and B, the core software platform 120 can copy the ValueIDs for these columns from column data blocks 1330 to memory array 1305 in order to restore these columns. However, because column C is deleted from memory array 1305, the core software platform 120 can skip over the corresponding column data block 1330 to prevent the copying of any ValueIDs for this column to memory array 1305.

FIG. 14 is a flowchart for 1400 for performing a rollover. At 1410, an in-memory array can be maintained. This array can hold a column of data. In some implementations, this in-memory array can correspond to memory array 805, for example.

At 1420, one or more pages can be maintained. In the implementation of FIG. 8, for example, these pages can correspond to pages 810A, 810B, and 810C. Each of these pages can include one or more rows (or row positions) for storing the column of data from the in-memory array.

At 1430, the column of data in the in-memory array can be monitored for a change. As described above with respect to FIGS. 10A and 10B, for example, this change can include an increase in the number of bits used to encode the ValueIDs in the in-memory array.

At 1440, a rollover can be performed on at least one of the pages based on this change. The rollover can reformat the page by rewriting its metadata. Doing so can reformat the page. In some implementations, this rollover process can be limited to unmaterialized pages.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method for implementation by one or more data processors forming part of at least one computing system, the method comprising:
   maintaining an in-memory array holding a column of data;
   maintaining one or more pages, each of the one or more pages having one or more rows for storing the column of data;
   monitoring a change in the column of data in the in-memory array, the change including an increase in a quantity of bits forming each of a plurality of values in the column of data; and
   in response to detecting the change in the column of data, performing a rollover on at least one of the one or more pages, the performing of the rollover comprising:
      determining additional memory resources required for the rollover;
      reformatting, based at least on the additional resources required for the rollover, the at least one page by at least rewriting metadata associated with the at least one page, the at least one page being reformatted to accommodate the increase in the quantity of bits forming each of the plurality of values in the column of data; and
      materializing data from the in-memory array to the reformatted at least one page, the materialization of the data comprising copying, to the reformatted at least one page, at least a portion of the plurality of values in the column of data.

2. The method of claim 1, wherein the performing of the rollover further comprises:
   determining that the at least page has not been materialized; and
   performing the rollover on the at least one page based at least on the at least one page not having been materialized.

3. The method of claim 1, wherein the performing of the rollover further comprises:
   determining, based at least on the additional resources required for the rollover, that the rollover requires one or more additional pages to accommodate a spillover from the at least one page, the spillover resulting from the increase in the quantity of bits forming each of the plurality of values in the column of data; and
   allocating the one or more additional pages prior to the performing of the rollover.

4. The method of claim 3, further comprising:
   determining, based at least on the additional resources required for the rollover, that the spillover from the at least one page impacts a succeeding page that has already been materialized;
   in response to determining that the spillover from the at least one page impacts a succeeding page that has already been materialized,
   creating a new set of pages,
      formatting the new set of pages to accommodate the increase in the quantity of bits forming each of the plurality of values in the column of data,
      materializing, to the new set of pages, at least the portion of the plurality of values from the column of data,
      creating a link between a last non-rolled over page and the new set of pages, and
      deleting the at least one page.

5. The method of claim 1, further comprising loading the at least one page to the in-memory array during a system restart.

6. The method of claim 5, wherein the loading comprises:
adding a new column to the in-memory array, a plurality of values in the new column populated with at least one of a null value and a default value.

7. The method of claim 5, wherein the loading comprises:
determining whether the column in the in-memory array has been deleted; and
not copying data from the at least one page based on the determining.

8. A non-transitory computer-readable medium containing instructions to configure a processor to perform operations comprising:
maintaining an in-memory array holding a column of data;
maintaining one or more pages, each of the one or more pages having one or more rows for storing the column of data;
monitoring a change in the column of data in the in-memory array, the change including an increase in a quantity of bits forming each of a plurality of values in the column of data; and
in response to detecting the change in the column of data, performing a rollover on at least one of the one or more pages, the performing of the rollover comprising:
determining additional memory resources required for the rollover;
reformatting, based at least on the additional resources required for the rollover, the at least one page by at least rewriting metadata associated with the at least one page, the at least one page being reformatted to accommodate the increase in the quantity of bits forming each of the plurality of values in the column of data; and
materializing data from the in-memory array to the reformatted at least one page, the materialization of the data comprising copying, to the reformatted at least one page, at least a portion of the plurality of values in the column of data.

9. The non-transitory computer-readable medium of claim 8, wherein the performing of the rollover further comprises:
determining that the at least page has not been materialized; and
performing the rollover on the at least one page based at least on the at least one page not having been materialized.

10. The non-transitory computer-readable medium of claim 8, the operations further comprising:
determining, based at least on the additional resources required for the rollover, that the rollover requires one or more additional pages to accommodate a spillover from the at least one page, the spillover resulting from the increase in the quantity of bits forming each of the plurality of values in the column of data; and
allocating the one or more additional pages prior to the performing of the rollover.

11. The non-transitory computer-readable medium of claim 10, the operations further comprising:
determining, based at least on the additional resources required for the rollover, that the spillover from the at least one page impacts a succeeding page that has already been materialized;
in response to determining that the spillover from the at least one page impacts a succeeding page that has already been materialized,
creating a new set of pages,
formatting the new set of pages to accommodate the increase in the quantity of bits forming each of the plurality of values in the column of data,
materializing, to the new set of pages, at least the portion of the plurality of values from the column of data,
creating a link between a last non-rolled over page and the new set of pages, and
deleting the at least one page.

12. The non-transitory computer-readable medium of claim 8, the operations further comprising loading the at least one page to the in-memory array during a system restart,
wherein the loading comprises one or more of the following:
adding a new column to the in-memory array, a plurality of values in the new column populated with at least one of a null value and a default value, and
determining whether the column in the in-memory array has been deleted, wherein data is not copied from the at least one page based on the determining.

13. A system comprising:
at least one processor; and
at least one memory, wherein the at least one processor and the at least one memory are configured to perform operations comprising:
maintaining an in-memory array holding a column of data;
maintaining one or more pages, each of the one or more pages having one or more rows for storing the column of data;
monitoring a change in the column of data in the in-memory array, the change including an increase in a quantity of bits forming each of a plurality of values in the column of data; and
in response to detecting the change in the column of data, performing a rollover on at least one of the one or more pages, the performing of the rollover comprising:
determining additional memory resources required for the rollover;
reformatting, based at least on the additional resources required for the rollover, the at least one page by at least rewriting metadata associated with the at least one page, the at least one page being reformatted to accommodate the increase in the quantity of bits forming each of the plurality of values in the column of data; and
materializing data from the in-memory array to the reformatted at least one page, the materialization of the data comprising copying, to the reformatted at least one page, at least a portion of the plurality of values in the column of data.

14. The system of claim 13, wherein the performing of the rollover further comprises:
determining that the at least pages has not been materialized; and
performing the rollover on the at least one page based at least on the at least one page not having been materialized.

15. The system of claim 13, the operations further comprising:
determining, based at least on the additional resources required for the rollover, that the rollover requires one or more additional pages to accommodate a spillover from the at least one page, the spillover resulting from the increase in the quantity of bits forming each of the plurality of values in the column of data; and allocating the one or more additional pages prior to the performing of the rollover.

16. The system of claim 13, the operations further comprising:
- determining, based at least on the additional resources required for the rollover, that the spillover from the at least one page impacts a succeeding page that has already been materialized;
- in response to determining that the spillover from the at least one page impacts a succeeding page that has already been materialized,
  - creating a new set of pages,
    - formatting the new set of pages to accommodate the increase in the quantity of bits forming each of the plurality of values in the column of data,
    - materializing, to the new set of pages, at least the portion of the plurality of values from the column of data,
    - creating a link between a last non-rolled over page and the new set of pages, and
    - deleting the at least one page.

17. The system of claim 13, the operations further comprising loading the at least one page to the in-memory array during a system restart,
- wherein the loading comprises one or more of the following:
- adding a new column to the in-memory array, a plurality of values in the new column populated with at least one of a null value and a default value, and
- determining whether the column in the in-memory array has been deleted, wherein data is not copied from the at least one page based on the determining.

* * * * *